United States Patent
Xu et al.

(10) Patent No.: US 6,800,424 B2
(45) Date of Patent: Oct. 5, 2004

(54) OPTICAL DEVICES MADE FROM RADIATION CURABLE FLUORINATED COMPOSITIONS

(75) Inventors: Baopei Xu, Lake Hiawatha, NJ (US); Louay Eldada, Randolph, NJ (US); Robert A. Norwood, West Chester, PA (US); Robert Blomquist, Whippany, NJ (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/338,811

(22) Filed: Jan. 8, 2003

(65) Prior Publication Data

US 2003/0207215 A1 Nov. 6, 2003

Related U.S. Application Data

(60) Division of application No. 09/745,076, filed on Dec. 20, 2000, now Pat. No. 6,555,288, which is a continuation-in-part of application No. 09/337,337, filed on Jun. 21, 1999, now Pat. No. 6,306,563.

(51) Int. Cl.[7] .................................................. G02B 6/16
(52) U.S. Cl. ....................... 430/321; 430/290; 385/122; 385/131; 385/5; 385/50; 385/130; 359/109
(58) Field of Search .................................. 430/321, 290; 385/122, 131, 130, 5, 50; 359/109

(56) References Cited

U.S. PATENT DOCUMENTS

| | | | |
|---|---|---|---|
| 4,609,252 A | | 9/1986 | Wong et al. |
| 4,877,717 A | | 10/1989 | Suzuki et al. |
| 5,024,507 A | * | 6/1991 | Minns et al. ............... 385/145 |
| 5,062,680 A | * | 11/1991 | Imamura et al. ........... 385/131 |
| 5,136,672 A | | 8/1992 | Mulholland et al. |
| 5,317,082 A | * | 5/1994 | Beuhler et al. ............. 528/353 |
| 5,396,350 A | | 3/1995 | Beeson et al. |
| 5,402,514 A | * | 3/1995 | Booth et al. ................ 385/130 |
| 5,428,468 A | | 6/1995 | Zimmerman et al. |
| 5,462,700 A | | 10/1995 | Beeson et al. |
| 5,481,385 A | | 1/1996 | Zimmerman et al. |
| 5,497,445 A | * | 3/1996 | Imoto ......................... 385/143 |
| 5,572,619 A | * | 11/1996 | Maruo et al. ............... 385/143 |
| 5,850,498 A | | 12/1998 | Shacklette et al. |
| 6,002,828 A | * | 12/1999 | Hult et al. .................. 385/141 |

OTHER PUBLICATIONS

L. Eldada, "Laser–Fabricated Low–Loss Single–Mode Raised–Rib Waveguiding Devices in Polymers", Journal of Lightwave Technology., vol. 14, No. 7 (1996) 1704–1714.*

* cited by examiner

Primary Examiner—Yvette C. Thornton

(57) ABSTRACT

The invention provides organic optical waveguide devices which employ perfluoropolymeric materials having low optical loss and low birefringence. An optical element has a substrate; a patterned, light transmissive perfluoropolymer core composition; and a light reflecting cladding composition on the pattern of the core. Writing of high-efficiency waveguide gratings is also disclosed.

8 Claims, 17 Drawing Sheets

Fig. 9
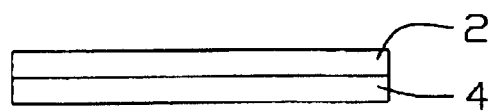
Fig. 10
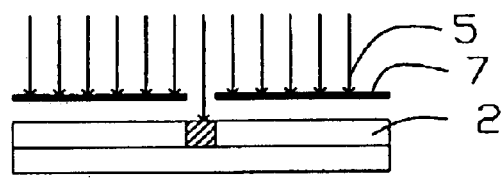
Fig. 11
Fig. 12
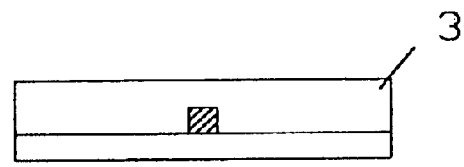
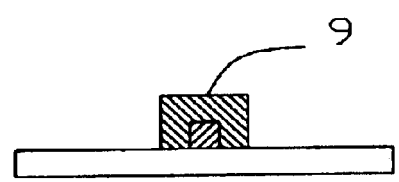
Fig. 13
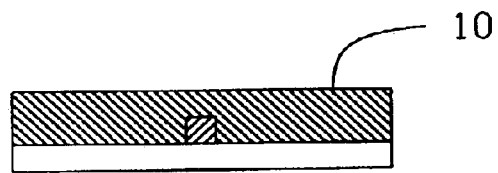
Fig. 14

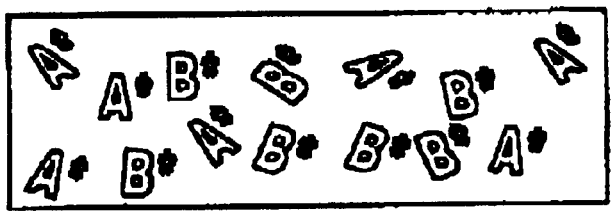
Fig. 33A
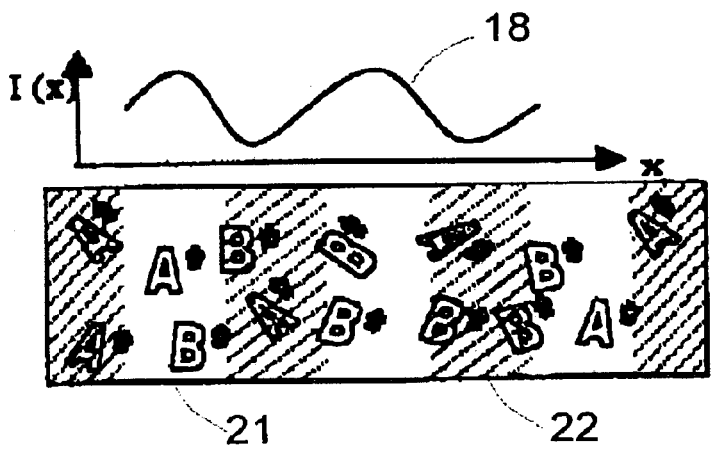
Fig. 33B
Fig. 33C
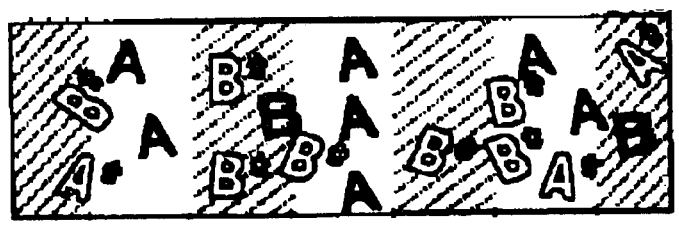
Fig. 33D
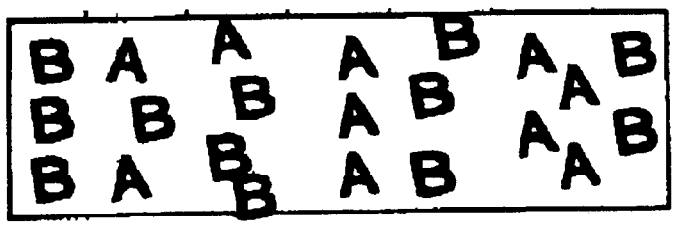
Fig. 33E
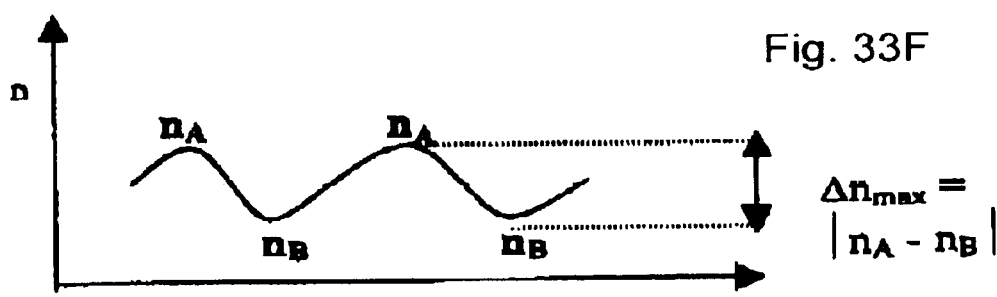
Fig. 33F
$\Delta n_{max} = |n_A - n_B|$

OPTICAL DEVICES MADE FROM RADIATION CURABLE FLUORINATED COMPOSITIONS

CROSS-REFERENCE TO RELATED APPLICATIONS

This application is a divisional application, filed under 37 C.F.R. §1.53(d), of U.S. application Ser. No. 09/745,076 filed on Dec. 20, 2000, now U.S. Pat. No. 6,555,288,which in turn is a continuation-in-part of U.S. application Ser. No. 09/337,337 filed on Jun. 21, 1999, now U.S. Pat. No. 6,306,563. The content of foregoing applications is relied on and the benefit of priority of the applications under 35 U.S.C. §120 is hereby claimed.

TECHNICAL FIELD AND INDUSTRIAL APPLICABILITY OF THE INVENTION

The invention relates to organic optical devices, such as planar single mode waveguides made from radiation curable materials. Specifically, the invention relates to low loss, low polarization dependent, devices made from fluorohydrocarbon monomers, oligomers, or polymer components end-capped with radiation curable ethylenically unsaturated groups, such as acrylate or methacrylate groups. The devices made from these materials show good long term and short term stability, good flexibility, and reduced stress or crack induced optical scattering loss.

BACKGROUND OF THE INVENTION

In optical communication systems, messages are transmitted by carrier waves at optical frequencies that are generated by such sources as lasers and light-emitting diodes. There is interest in such optical communication systems because they offer several advantages over conventional communication systems.

One preferred means for switching or guiding waves of optical frequencies from one point to another is by an optical waveguide. The operation of an optical waveguide is based on the fact that when a light-transmissive medium is surrounded or otherwise bounded by another medium having a lower refractive index, light introduced along the inner medium's axis is highly reflected at the boundary with the surrounding medium, thus producing a guiding effect.

A wide variety of optical devices can be made which incorporate a light guiding structure as the light transmissive elements. Illustrative of such devices are planar optical slab waveguides, channel optical waveguides, rib waveguides, optical couplers, optical splitters, optical switches, optical filters, variable attenuators, micro-optical elements and the like. These devices are described in more detail in U.S. Pat. Nos. 4,609,252, 4,877,717, 5,136,672, 5,136,682, 5,481,385, 5,462,700, 5,396,350, 5,428,468, 5,850,498, and U.S. patent application Ser. No. 08/838,344 filed Apr. 8, 1997, the disclosures of which are all incorporated herein by reference.

It is known in the art to make optical Waveguides and other optical interconnect devices from organic polymeric materials. Whereas single mode optical devices made from planar glass are relatively unaffected by temperature, devices made from organic polymers show a far greater variation with temperature because the refractive index changes much faster with temperature in polymeric materials than in glass. This property can be exploited to make active, thermally tunable or controllable devices incorporating light transmissive elements made from organic polymers. One type of thermally tunable devices is a directional coupler activated by a thermo-optic effect. The thermo-optic effect is a change in the index of refraction of the optical element that is induced by heat. Thermo-optic effect devices help to provide less costly routers when the activation speed of a coupler state is not too high, i.e., when the activation speed is in the range of milliseconds.

Unfortunately, most polymeric materials contain carbon-to-hydrogen chemical bonds which absorb strongly at the 1550 nm wavelength that is commonly used in telecommunication applications. It has long been known that fluoropolymers, for example, have significantly reduced absorption at 1550 nm. While planar waveguides made from fluorinated polyimide and deuterated polyfluoromethacrylate have achieved single mode losses of as little as 0.10 db/cm at 1300 nm, it is relatively difficult to make optical devices from these materials. Specifically, the photolithographic process by which they have been made includes a reactive ion etching step. Fluorinated polyimide and deuterated polyfluoromethacrylate also have higher losses at 1550 nm, typically on the order of 0.6 dB/cm.

Photopolymers have been of particular interest for optical interconnect applications because they can be patterned using standard photolithographic techniques. As is well known, photolithography involves patternwise exposure of a light-sensitive polymeric layer deposited on a chosen substrate followed by development of the pattern. Development may be accomplished, for example, by removal of the unexposed portion of the photopolymeric layer by an appropriate solvent.

U.S. Pat. No. 4,609,252 teaches one method of lithographically forming optical elements using an acrylic photoreactive composition which is capable of forming a waveguide material upon polymerization. This patent teaches one to utilize polymers with as high a glass transition temperature as possible, i.e., 90° C.–220° C., in order to provide for the greatest operating temperatures. U.S. Pat. No. 5,136,682 teaches the production of waveguides using photopolymerizable compositions such as acrylics having a glass transition point, $T_g$, of at least 100° C. The foregoing waveguides, however, suffer from undesirably high optical loss and are not sufficiently flexible.

Among the many known photopolymers, acrylate materials have been widely studied as waveguide materials because of their optical clarity, low birefringence and ready availability of a wide range of monomers. However, the performance of optical devices made from many acrylate materials has been poor, due to high optical losses, poor resistance to aging and yellowing, and thermal instability of the polymerized material.

There continues to be a need for low loss radiation curable materials that can be used to make optical devices by a more direct process having fewer manufacturing steps. Specifically, a process is desired that does not require a reactive ion etching (RIE) step to develop the pattern of the optical element core. Such materials could be used to make optical devices by a relatively simple and more direct lithographic procedure.

It is also important that these materials have little or no birefringence. As is well known in this art, birefringence is the difference between the refractive index of the transverse electric or TE polarization (parallel to the substrate surface) and the transverse magnetic or TM polarization (perpendicular to the substrate surface). Such birefringence is undesirable in that it can lead to devices with large polarization dependant losses and increased bit error rates in telecommunication systems.

Another type of useful optical device is a waveguide grating. Diffraction gratings, e.g., Bragg gratings, are used in the telecommunications industry to isolate a narrow band of wavelengths from a broader telecommunications signal. Polymeric planar waveguide gratings have a number of advantages in terms of their relative ease of manufacture and their ability to be tuned over a wide range of frequencies by temperature or induced stress. In addition, such devices have the advantage of being easily incorporated into integrated devices. Unfortunately, such gratings in polymeric materials typically are of relatively low efficiency. This drawback can result in poor signals with increased bit error rates. It would, therefore, be beneficial to find a method of making polymeric planar waveguide gratings with improved efficiency.

Dense Wavelength Division Multiplexing (DWDM) systems have recently attracted a lot of interest because they address the need for increased bandwidth in telecommunication networks. The use of DWDM systems allows the already installed point-to-point networks to greatly multiply their capacity without the expensive installation of additional optical fiber. DWDM systems can send multiple wavelengths (signals) over the same fiber by using passive optical components to multiplex the signals on the one end of the line and demultiplex them on the other end of the line. Polymeric materials provide a low-cost, alternative solution to a variety of optical components for DWDM.

WDM devices can be designed by using planar waveguides with gratings that can reflect a single wavelength or channel as a building block. These devices can be fabricated with low temperature processes and high throughput. In this disclosure, we focus on the properties of this fundamental building block, the fabrication of a grating in a waveguide structure, outline what we believe is the basic mechanism responsible for the grating formation, and its environmental, humidity and temperature performance.

Prior approaches to meeting these needs have not been completely satisfactory, and the present invention provides significant and unexpected improvements applicable to this technology in order to satisfy the materials, process, and device application requirements noted above.

BRIEF SUMMARY OF THE INVENTION

According to one aspect of the invention, there is provided a photolithographic method of making optical elements comprising:
(a) applying a core photopolymerizable composition to a support to form a core photopolymerizable composition layer, said core photopolymerizable composition including at least one photoinitiator and at least one core photopolymerizable monomer, oligomer, or polymer having at least one photopolymerizable group, said core photopolymerizable monomer, oligomer, or polymer including a perfluorinated substituent;
(b) imagewise exposing the core photopolymerizable composition layer to sufficient actinic radiation to effect the at least partial polymerization of an imaged portion and to form at least one non-imaged portion of said core photopolymerizable composition layer;
(c) removing said at least one non-imaged portion without removing said imaged portion, thereby forming a light transmissive patterned core from said imaged portion;
(d) applying an upper cladding polymerizable composition onto the patterned core; and
(e) curing said upper cladding composition, wherein said upper cladding and the core-interfacing surface of said support are each made from materials having a lower refractive index than said core.

According to another aspect of the invention, there is provided a reactive ion etching method of making optical elements comprising:
(a) applying a photopolymerizable composition to a support to form a photopolymerizable composition layer, said photopolymerizable composition including an effective amount of at least one photoinitiator and at least one photopolymerizable monomer, oligomer, or polymer having at least one photopolymerizable group, said photopolymerizable monomer, oligomer, or polymer including a perfluorinated substituent;
(b) at least partially curing said layer;
(c) forming a core by reactive ion etching;
(d) applying an upper cladding polymerizable composition onto said core; and
(e) at least partially curing said upper cladding composition to form an upper cladding.

According to another aspect of the invention, a light-guiding optical element is provided which includes:
(a) an organic upper cladding layer;
(b) an organic light transmissive core comprising a fluoropolymer including at least one perfluorinated substituent;
(c) an organic lower cladding layer; and
(d) a substrate.

According to another aspect of the invention, a method of transmitting optical information is provided, the method comprising:
(a) providing an information-bearing optical signal; and
(b) passing the optical signal through a light-transmissive polymer formed from a perfluorinated radiation curable monomer, oligomer, or polymer having at least one radiation curable group selected from the group consisting of epoxy or ethylenically unsaturated group.

According to another aspect of the invention, a composition is provided, the composition comprising:
(a) a first photocurable multifunctional perfluorinated compound having a first functionality;
(b) a second photocurable multifunctional perfluorinated compound having a second functionality, wherein the difference between said second functionality and said first functionality is at least one; and
(c) an effective amount of a photoinitiator.

According to another aspect of the invention, a waveguide grating is provided, the grating being made from the composition listed above.

Polymerizable compositions for making waveguides in which diffraction gratings can be written are preferably combinations of multifunctional halogenated acrylate monomers, oligomers, or polymers. Ideally, the comonomers are fluorinated species to reduce optical losses through the cured composition. Mixtures of these monomers can form highly cross-linked networks while allowing at the same time the precise formulation of the refractive index. The ability to control the refractive index to $10^{-4}$ accuracy makes possible the fabrication of single mode waveguide structures with well-defined numerical apertures (NA).

One particular combination of comonomers described in this patent application is especially well-suited for writing diffraction gratings in the waveguides made according to the fabrication methods taught here. Using this material, a single mode channel waveguide has been found to have a loss of 0.24 dB/cm as determined by the cleave-back method. This material exhibits low dispersion (on the order of $10^{-6}$ at 1550 nm), low birefringence ($\approx 10-4$), and high environmental stability. It also allows formation of waveguide gratings with excellent filter characteristics. In a 2 cm grating, reflectivity over 99.997% and a 0.2 nm width in the reflection peak at the 3 dB point in reflectivity has been measured. Furthermore, no side lobes have been observed in the reflection spectrum.

It has also been discovered that a good system-candidate for strong gratings is a mixture of two monomers with different polymerization rates each of which forms a polymer when fully cured having different indices of refraction. Comonomers differing in reactive group functionality are also preferred for making gratings in waveguides. Such systems perform well when roughly equal weight proportions of each comonomer is present in the polymerizable system. More specifically, the preferred systems include a photocurable tetra-functional monomer, an approximately equal weight proportion of a photocurable di-functional monomer, and an effective amount of a photoinitiator.

Preferred photopolymerizable monomers, oligomers, and polymers have the structure

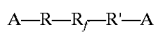

where

R and R' are divalent or trivalent connecting groups selected from the group consisting of alkyl, aromatic, ester, ether, amide, amine, or isocyanate groups;

said polymerizable group, A, is selected from the group consisting of

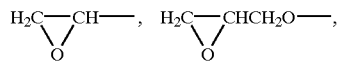

$CY_2=C(X)COO$—, and
$CH_2=CHO$—;
where
Y=H or D, and
X=H, D, F, Cl or $CH_3$; and
said perfluorinated substitutent, $R_f$, is selected from the group consisting of —$(CF_2)_x$—,
—$CF_2O$—$[(CF_2CF_2O)_m(CF_2O)_n]$—$CF_2$—,
$CF(CF_3)O(CF_2)_4O[CF(CF_3)CF_2O]_pCF(CF_3)$—, and
$CF_2O$—$(CF_2CF_2O)_m$—$CF_2$— where x is 1–10, m and n designate the number of randomly distributed perfluoroethyleneoxy and perfluoromethyleneoxy backbone repeating subunits, respectively, and p designates the number of —$CF(CF_3)CF_2O$— backbone repeating subunits.

These and other aspects of the invention will become apparent from the detailed description of the invention set forth below.

BRIEF DESCRIPTION OF THE DRAWINGS

FIG. 9 is a section view of a layer of uncured core polymerizable composition on a substrate.

FIG. 10 is a section view of the imagewise actinic radiation exposure of the core polymerizable composition of FIG. 9.

FIG. 11 is a section view of the cured and developed core in contact with the substrate.

FIG. 12 is a section view of a layer of uncured upper cladding polymerizable composition covering the core and substrate.

FIG. 13 is a section view of an optical device resulting from imagewise exposure to actinic radiation and development of the layer of upper cladding polymerizable composition of FIG. 12.

FIG. 14 is a section view of an optical device resulting from blanket of the layer of upper cladding polymerizable composition of FIG. 12 exposure to actinic radiation.

FIG. 33A is a schematic representation of the distribution of monomers before grating writing.

FIG. 33B is a graph of the sinusoidal intensity of light passing through a grating writing phase mask.

FIG. 33C–FIG. 33D are schematic representations of monomer diffusion and creation of a polymer concentration gradient during the writing of a grating in a waveguide.

FIG. 33E is a schematic representation of the polymer concentration gradient "locked in" after the full cure step of grating writing.

FIG. 33F is a graph of modulation of the refractive index in the waveguide following writing of the grating.

DETAILED DESCRIPTION OF THE PREFERRED EMBODIMENT(S)

The invention will now be described in more detail by way of example with reference to the embodiments shown in the accompanying figures. It should be kept in mind that the following described embodiments are only presented by way of example and should not be construed as limiting the inventive concept to any particular physical configuration.

Figure 1:
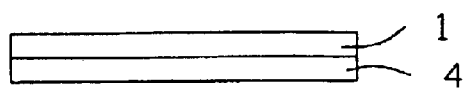
FIG. 1 is a section view of a layer of uncured lower cladding polymerizable composition on a substrate.

According to a preferred embodiment of the invention, a film of a lower cladding polymerizable composition 1 is applied to the surface of a substrate 4, as shown in FIG. 1. The film may be applied in a number of different ways known in the art, such as spin coating, dip coating, slot coating, roller coating, doctor blading, liquid casting or the like. Generally, the lower cladding polymerizable composition is applied at a thickness of from at least about 0.01 microns, preferably at least about 1 micron, to about 10 microns or more.

While the lower cladding can be made from any material having a refractive index lower than the core, the most preferred lower cladding material is a fluoropolymeric composition as described below. A low loss cladding material, such as a fluorinated polymer, is preferred in part because while the majority of the optical signal is transmitted through the core, a portion of the signal is transmitted through the cladding material.

Figure 2:
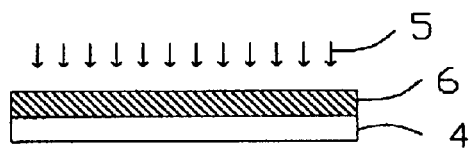
FIG. 2 is a section view of the lower cladding polymerizable composition of FIG. 1 being cured to form the lower cladding layer.

Preferably, the lower cladding polymerizable composition is curable by heat and/or actinic radiation. More preferably, the lower cladding polymerizable composition is photocurable by actinic radiation. Upon exposure to an appropriate source of radiation 5 effective to at least partially cure the lower cladding polymerizable composition, as shown in FIG. 2, a lower cladding 6 is formed on the substrate 4. Preferably, the radiation 5 is a blanket or overall, non-imagewise exposure of ultraviolet radiation.

Figure 3:
FIG. 3 is a section view of a layer of uncured core polymerizable composition on the lower cladding layer of FIG. 2.

To form the light transmissive region or core, a thick or thin film of a core polymerizable composition 2 is applied to the lower cladding 6, as shown in FIG. 3. Generally, the core polymerizable composition is applied at a thickness of from about 1 micron to about 1 mm, preferably from about 5 microns to about 500 microns. Preferably, the core polymerizable composition is photopolymerizable, i.e., curable by exposure to actinic radiation. As described more fully below, the preferred core polymerizable compositions is a low loss fluorinated material.

Figure 4:
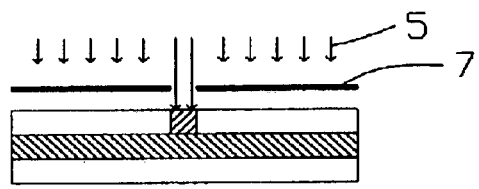
FIG. 4 is a section view of the imagewise actinic radiation exposure of the core polymerizable composition of FIG. 3.

In one embodiment of the invention, the core polymerizable composition layer is imagewise exposed to a suitable form of curing radiation 5 that is effective to at least partially cure the exposed, image portion of the core polymerizable composition layer without substantially curing the unexposed, non-image areas of the core polymerizable composition layer, as shown in FIG. 4. Preferably, the curing radiation 5 is actinic radiation, more preferably ultraviolet radiation, exposed through a core photomask 7. The position and dimensions of the light transmissive core is determined by the pattern of the actinic radiation upon the surface of the film. The radiation pattern preferably is chosen so that the polymerizable composition is polymerized in the desired pattern and so that other regions of the core polymerizable film remain substantially unreacted. If, as in a preferred embodiment, the polymerizable composition is photocurable, the photopolymer is conventionally prepared by exposing the core polymerizable composition to actinic radiation of the required wavelength and intensity for the required duration to effect the at least partial curing of the photopolymer.

In one preferred embodiment, the core polymerizable composition is not fully cured, but is only partially polymerized prior to applying the upper cladding polymerizable composition. Partial polymerization of the core polymerizable composition layer prior to application of the upper cladding polymerizable composition layer allows the two compositions to intermingle at their interface. This improves adhesion of the two layers and also reduces optical loss by reducing scattering at the interface of the core and cladding. Additionally, by not fully polymerizing the core at this point in the process allows for the writing of diffraction gratings in the core layer in a subsequent step, if desired, as described more fully below. The same partial polymerization technique can be used at the lower cladding/core interface as well by not fully curing the lower cladding polymerizable composition layer before applying the core polymerization composition layer.

Figure 5:
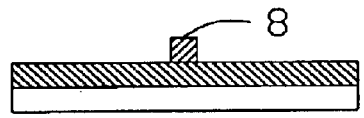
FIG. 5 is a section view of the core on the lower cladding layer.

After the core polymerizable composition has been at least partially polymerized to form the predetermined pattern of the polymer on the surface of the lower cladding, the pattern is developed by removing the nonimage areas and leaving intact the predetermined pattern of core 8, as shown in FIG. 5. Any conventional development method can be used, for example, flushing with a solvent for the unirradiated composition. Such solvents include polar solvents, such as alcohols and ketones. The most preferred solvents are acetone, methanol, propanol, tetrahydrofuran and ethyl acetate. For highly fluorinated materials, the preferred solvent is Galden® HT-110, a perfluorinated ether available from Ausimont USA.

Although FIG. 4–FIG. 5 show the formation of just one core using a photomask having one transparent image-forming region, the skilled artisan will appreciate that multiple spaced-apart cores could be formed on the lower cladding simultaneously using a photomask having multiple transparent image-forming regions or similar devices capable of causing the exposure of multiple image areas.

Figure 6:
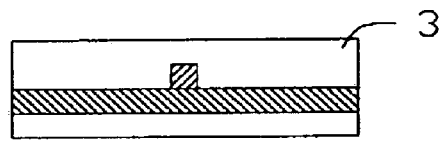
FIG. 6 is a section view of a layer of uncured upper cladding polymerizable composition covering the core and lower cladding.

Two alternative methods of forming the upper cladding will now be described. In each case, a film of upper cladding polymerizable composition 3 is applied over the lower cladding 6 and core 8, as shown in FIG. 6. Like the lower cladding layer, while the upper cladding can be made from any material having a refractive index lower than the core, the most preferred upper cladding material is a fluoropolymeric composition as described below. As noted above, a low loss cladding material is preferred in part because a portion of the optical signal is transmitted through the cladding material.

Preferably, the upper cladding polymerizable composition is curable by heat and/or actinic radiation. More preferably, the upper cladding polymerizable composition is photocurable by actinic radiation. The preferred form of actinic radiation is ultraviolet radiation.

Figure 7A:
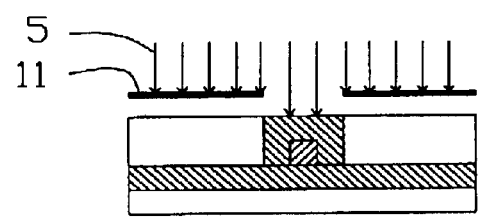
FIG. 7A is a section view of the imagewise actinic radiation exposure of the upper cladding polymerizable composition of FIG. 6.
Figure 7B:
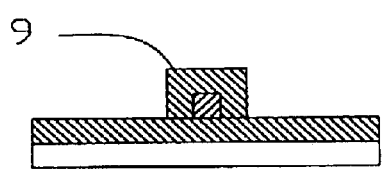
FIG. 7B is a section view of an optical device resulting from development of the upper cladding layer shown in FIG. 7A.

The upper cladding polymerizable composition layer is at least partially cured by an appropriate form of curing radiation 5. In one method shown in FIG. 7A–FIG. 7B, actinic radiation is exposed through an imaging cladding photomask 11 to form an imaged, at least partially cured region and unexposed, uncured regions. The upper cladding 9 is developed by removal of the unexposed, uncured regions by an appropriate solvent, for example. The resulting core 8 and upper cladding 9 form a ridge-like structure extending above the plane of the lower cladding 6 and substrate 4. Upper cladding 9 covers the top and sides of the core 8. This type of upper cladding 9 is advantageous since its core 8 exhibits low internal stresses. Preferably, the core 8 is entirely enveloped by the lower cladding 6 and upper cladding 9. The upper and lower claddings may, of course, be referred to collectively as simply the cladding.

Figure 8A:
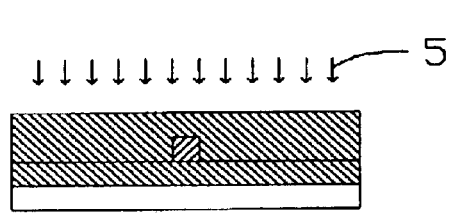
FIG. 8A is a section view of the blanket exposure of the upper cladding polymerizable composition of FIG. 6 with actinic radiation to form the upper cladding layer.
Figure 8B:
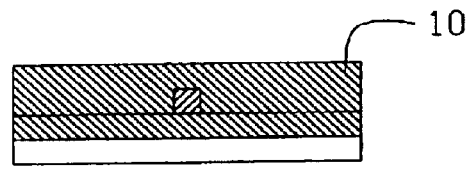
FIG. 8B is a section view of an optical device resulting from curing of the upper cladding layer shown in FIG. 8A.

In an alternative method shown in FIG. 8A–FIG. 8B, the upper cladding polymerizable composition layer 3 is simply blanket, overall, or non-imagewise exposed to a suitable form of curing radiation 5 effective to at least partially cure the upper cladding polymerizable composition, as shown in FIG. 8A, to form a planar upper cladding layer 10, as shown in FIG. 8B. Preferably, the core 8 is entirely enveloped by the lower cladding 6 and upper cladding 10.

So that the resulting structure functions as a waveguide by guiding light through the core, the polymerizable compositions are selected so that the refractive index of the lower cladding (fully cured) and the refractive index of the upper cladding (fully cured) are both less than the refractive index of the core (fully cured). The refractive indices of the lower and upper cladding layers can be the same or different. Preferably, the lower cladding has a similar $T_g$ property as that of the upper cladding, but it need not be made from the identical composition. The lower cladding polymerizable composition and processing conditions are selected such that the $T_g$ of the polymerized lower cladding layer preferably ranges from about 60°C. or less, more preferably about 40° C. or less and even more preferably about 25° C. or less. Preferably, the refractive index of the upper cladding will be the same as that of the lower cladding. The lower cladding polymerizable composition and the upper cladding polymerizable composition may be the same material.

If diffraction gratings are not to be written in the waveguide, after application of the upper cladding polymerizable composition, any unpolymerized or not fully polymerized portions of the upper cladding, lower cladding or core layers may be subjected to a hard curing by a blanket or overall exposure to actinic radiation such that they are substantially fully polymerized. In this manner, the core and cladding compositions intermix at their interface and can be mixed in any desired proportions to fine tune the refractive indices of the cladding, core and the overall device and insure good adhesion between the layers by covalent bonding.

If diffraction gratings are to be written in the partially cured waveguide, reasonable measures should be taken to protect the waveguide laminate from further polymerization, such as that induced by actinic radiation or heat, until the grating writing step.

In some cases, for example, when the refractive index of the substrate is less than that of the core, a lower cladding will not be necessary. One process of making a light-guiding optical device without a lower cladding is illustrated in FIG. 9–FIG. 14. To form the core 8, a film of a core polymerizable composition 2 is applied to the substrate 4, as shown in FIG. 9. The core polymerizable composition layer 2 is imagewise exposed, e.g., through core photomask 7, to a suitable form of curing radiation 5, e.g., ultraviolet radiation, that is effective to at least partially cure the exposed, image portion of the core polymerizable composition layer without substantially curing the unexposed, non-image areas of the core polymerizable composition, as shown in FIG. 10. Upon development of the imaged area by removal of the uncured non-image area, as by an appropriate solvent for the uncured non-imaged area but not for the cured image area, a core 8 is formed on the substrate 4 without an intervening lower cladding layer between the core and substrate, as shown in FIG. 11.

The upper cladding layers 9, 10 can be formed in accordance with the description above. That is, an upper cladding polymerizable composition 3 is applied over the substrate 4 and core 8, as shown in FIG. 12. The upper cladding polymerizable composition layer 3 may then be cured by an appropriate form of curing radiation to form an at least partially cured upper cladding layer. In one variation of this method similar to that shown in FIG. 7A, an upper cladding photomask, an appropriately selected curing radiation effective to at least partially cure the upper cladding polymerization composition, and development of the imaged area can be used to form the upper cladding layer 9 to produce the lower cladding-free ridge-like optical device 13 shown in FIG. 13. Alternatively, the upper cladding polymerizable composition layer is simply blanket-, overall-, or non-imagewise-exposed to a suitable form of curing radiation, such as ultraviolet radiation, by a method similar to that shown in FIG. 8A, to form planar upper cladding 10, as shown in FIG. 14.

In addition to using these materials for making planar waveguides by the lithographic method described above, reactive ion etching (RIE) may also be used to make planar waveguides in a manner similar to that described in the Journal of Lightwave Technology, Vol. 16, June 1998, page 1024.

Figure 18:
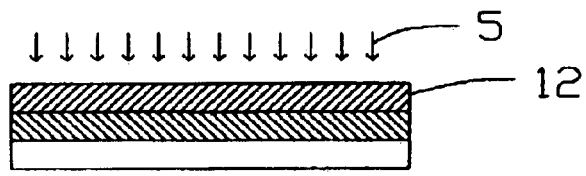
FIG. 18 is a section view of the at least partial curing of the core layer.
Figure 19:
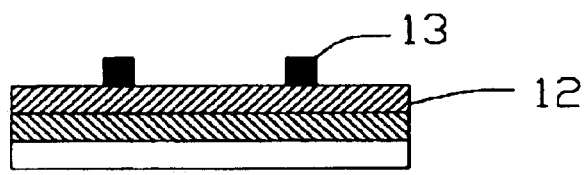
FIG. 19 shows the patterned reaction ion etching-resistant layer on the upper cladding layer.
Figure 20:
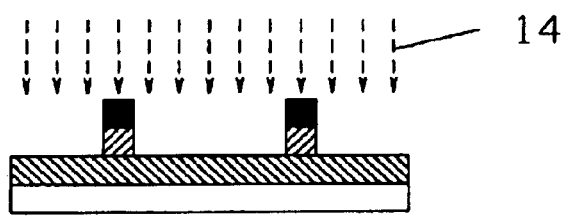
FIG. 20 is a section view of the reaction ion-etching step.
Figure 21:
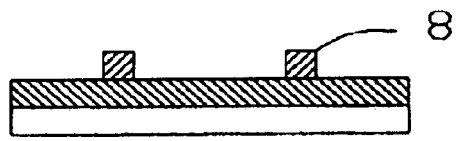
FIG. 21 is a section view of the device after removal of the RIE-resistant layer.
Figure 22:
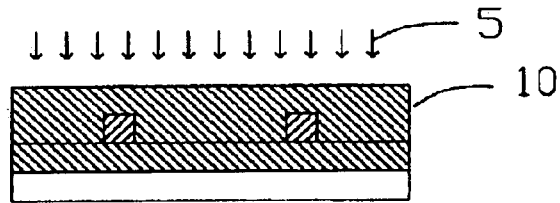
FIG. 22 is a section view of the uniform curing of the upper cladding.

A representative procedure for making waveguides by a RIE method is shown in FIGS. 15–22. A uniform polymerized core layer 12 is provided on top of a polymerized lower cladding layer 6 atop substrate 4 using actinic radiation 5 as described previously and as shown in FIG. 15–FIG. 18. Preferably, the lower cladding and/or core layers are partially rather than fully polymerized to improve interlayer adhesion, and to allow for subsequent writing of a grating in the waveguide, if desired. A patterned RIE resistant layer (mask) 13 could then be applied on top of the core layer 12 by procedures known in the art, such as conventional photolithographic or other type patterning methods, as shown in FIG. 19. The patterning preferably would be selected such that the RIE resistant layer 13 would lie above the area where the waveguide core is desired. Such an RIE resistant layer could be composed of a photoresist, a dielectric layer, or a metal as is familiar to those skilled in the art. Reactive ion etching would then be employed using ion beams 14 to remove the core material down to the level of the lower cladding, as shown in FIG. 20. The area of the core protected from the ion beams by the RIE resistant layer would remain after removal of the RIE resistant layer by conventional techniques, as indicated by core 8 at FIG. 21, thereby producing a raised rib structure of waveguide core 8 made of the core material. A top coat of upper cladding material could be applied and cured using actinic radiation 5 to form upper cladding layer 10 to complete the waveguide, as shown in FIG. 22.

As mentioned previously, partial polymerization of the layers could be used to improve the interlayer adhesion, reduce optical losses, and allow for writing of a grating in the waveguide in a subsequent step. It is especially advantageous to leave the lower cladding layer only partly polymerized before the core layer is applied. In this case the subsequent radiation dose applied to the core, as shown in FIG. 18, also acts to further polymerize the lower cladding and strengthens the bond between the layers.

Figure 15:
FIG. 15 is a section view of a layer of uncured lower cladding polymerizable composition on a substrate.
Figure 16:
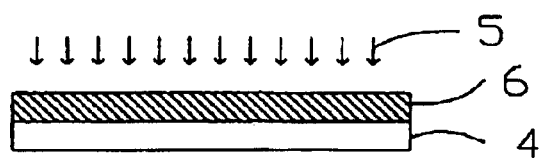
FIG. 16 is a section view of the lower cladding polymerizable composition of FIG. 15 being cured to form the lower cladding layer.
Figure 17:
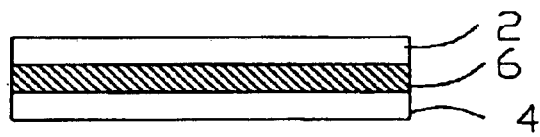
FIG. 17 is a section view of a layer of uncured core polymerizable composition on the lower cladding layer of FIG. 16.
Figure 23:
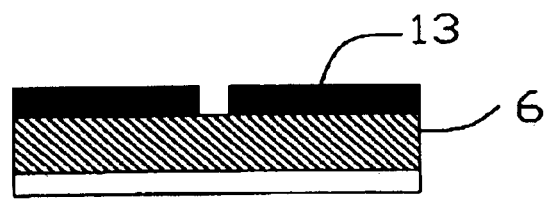
FIG. 23 is a section view of an alternative pattern of the RIE-resistant material suitable for forming a trench.

Another method of making waveguides by RIE also begins by at least partially polymerizing a lower cladding coating layer 1 applied to a substrate 4 with actinic radiation 5 to form a lower cladding layer 6, as previously described and shown in FIG. 15 and FIG. 16. An RIE resistant layer 13 could then be patterned on top of the lower cladding layer 6, as shown in FIG. 23. The lower cladding layer 6 in FIG. 23 is relatively thicker than the lower cladding layer 6 shown in FIG. 16 for clarity in describing the method involving a RIE step. The figures are not drawn to scale.

Figure 24:
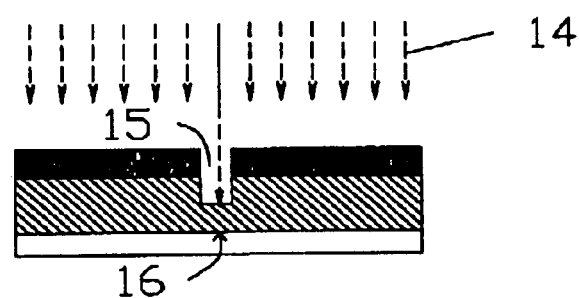
FIG. 24 is a section view of the reaction ion-etching step forming a trench.
Figure 25:
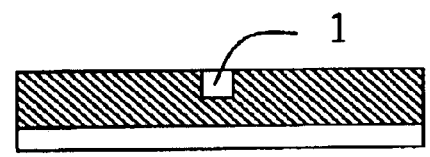
FIG. 25 is a section view showing uncured core polymerizable material in the trench.
Figure 26:
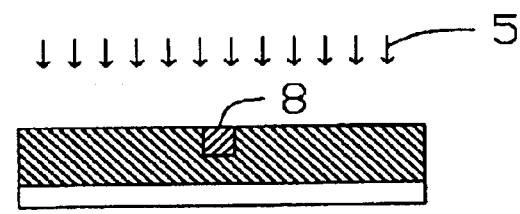
FIG. 26 is a section view of the at least partial curing of the core.
Figure 27:
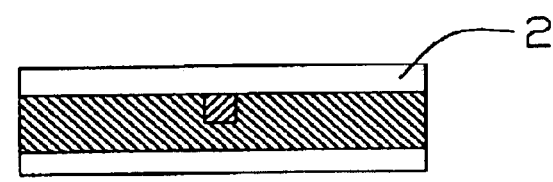
FIG. 27 is a section view of the application of an uncured coating.
Figure 28:
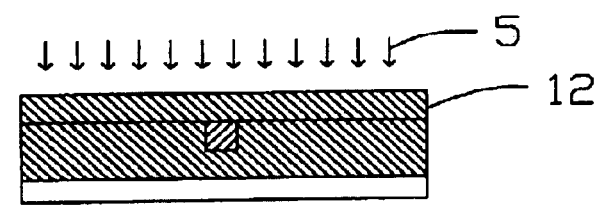
FIG. 28 is a section view of the uniform curing of the upper cladding layer.

The resistant layer 13 is preferably applied in vertical registration with the portions of the lower cladding layer that will remain after formation of the waveguide core. Reactive ion etching could then be performed using ion beams 14 to remove the unprotected portions of lower cladding layer 6 down to a desired depth, i.e., to remove the lower cladding layer except where the RIE resistant layer was patterned, to produce a trench 15, as shown in FIG. 24. In cases where the index of refraction of the substrate is higher than that of the cured core material, a residual portion 16 of the lower cladding is not removed during the ion etching step. In cases where the substrate has a lower refractive index than the cured core, the lower cladding layer may be removed down to the level of the substrate, if desired (not shown). The trench 15 could then be at least partially filled with core material 1, as shown in FIG. 25. The uncured core material could then be at least partially cured by actinic radiation 5 to form a waveguide core 8, as shown in FIG. 26. Subsequently, an upper cladding coating layer 2 can be applied by methods previously described, for example, as shown at FIG. 27. As described previously, by only partially polymerizing the layers, the interlayer adhesion and the optical losses can be improved, and gratings can later be written in the waveguide, if desired. The upper cladding coating layer 2 may then be uniformly cured by actinic radiation to form an upper cladding 12, as shown in FIG. 28.

Further techniques that may be used include micro replication as exemplified in U.S. Pat. No. 5,343,544, the disclosure of which is incorporated herein by reference, direct laser writing similar to that described in the Journal of Lightwave Technology, Vol.14, No. 7, July 1996, page 1704, and laser ablation similar to that described in U.S. Pat. No. 5,106,211, the disclosure of which is incorporated herein by reference.

Insofar as the combined lower cladding/substrate of FIG. 5 or the substrate of FIG. 11 each serves to support the core, either structure may be referred to as a core support.

Figure 29:
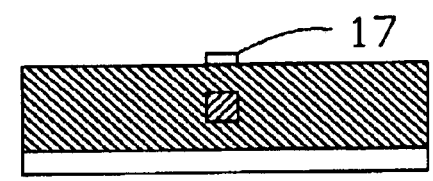
FIG. 29 is a section view of a waveguide device having an electrode aligned with the core.

Regardless of the specific manner of making the waveguide device, i.e., with or without a RIE step, optional additional layers may also be employed above or below the upper cladding or lower cladding, respectively. For example, one or more conductive layers, such as electrode 17 shown in FIG. 29, could be applied above the upper cladding layer for use in thermo-optic applications using patterning or other method known to those skilled in the art. Preferably, the electrode 17 is aligned in registration with the core. The conductive layer may be made of metal or a conductive polymer, for example.

If the core has a refractive index that is lower than the substrate material, it is necessary to first form a layer of material having a refractive index lower than the refractive index of the core. Such a layer may be referred to as a buffer layer and may be comprised of, for example, a semiconductor oxide, a lower refractive index polymer (as in the method shown by FIG. 1.–FIG. 6), or a spin-on silicon dioxide glass material.

The substrate may be any material on which it is desired to establish a waveguide. The substrate material may, for example, be selected from glass, quartz, plastics, ceramics, crystalline materials and semiconductor materials, such as silicon, silicon oxide, gallium arsenide, and silicon nitride. Formation of the optical elements on wafers made of silicon or other compositions are specifically contemplated. Silicon wafers are preferred substrates in part due to their high surface quality and excellent heat sink properties. To improve adhesion of the photopolymer to the silicon wafer, the wafer may be cleaned and treated with silane or other adhesion promoter, if desired. The substrate may or may not contain other devices, either topographical features such as grooves or electrical circuits, or electro-optic devices such as laser diodes.

A preferred plastic substrate is a urethane-coated polycarbonate substrate which is described in provisional patent application Ser. No. 60/121,259 filed on Feb. 23, 1999, for "Control of Temperature Dependent Planar Polymeric Waveguide Devices through the use of Substrate and Suprastrate Layers with Specific Coefficients of Thermal Expansion," the disclosure of which is incorporated herein by reference.

The terms "lower cladding" and "upper cladding" refer to cladding layers positioned on opposite sides of a core. Accordingly, the terms "lower cladding" and "upper cladding" are used here without regard to their position relative to any gravitational field.

The terms "lower cladding polymerizable composition," "upper cladding polymerizable composition," and "core polymerizable composition" correspond to the third, second, and first compositions, respectively, of co-pending patent application Ser. No. 08/838,344 filed Apr. 8, 1997. Compositions suitable for use as a lower cladding, upper cladding, or core polymerizable composition are not limited, however, to the compositions described in the 08/838,344 application.

The polymerizable compositions suitable for use in this invention include a polymerizable compound or mixture of two or more polymerizable compounds and other additives, such as photoinitiators. The polymerizable compounds which can be used to form the cladding and core may be monomers, oligomers, or polymers which are addition polymerizable, nongaseous (boiling temperature above 30° C. at atmospheric pressure) compounds containing at least one and preferably two, three, four, or more polymerizable groups, e.g., an epoxy or ethylenically unsaturated group, and are capable of forming high molecular weight polymers by radical cation initiated or free radical initiated, chain propagating addition polymerization. Such compounds are well known in the art. The polymerizable compounds may be polymerized by the action of actinic radiation, heat, or both. The polymerizable compounds that can be polymerized by the action of actinic radiation may be referred to as being photopolymerizable, photocuring, photocurable, radiation curable, or the like. In one preferred embodiment, at least one of the polymerizable compounds contains at least two polymerizable groups per polymerizable monomer, oligomer, or polymer, e.g., at least two epoxy or ethylenically unsaturated groups. Accordingly, the preferred polymerizable compounds are multi-functional, i.e., di-functional, tri-functional, tetra-functional, etc., in that they include at least two polymerizable functional groups. At least one of the polymerizable compounds may contain, for example, four polymerizable groups, in particular, four epoxy or four ethylenically unsaturated groups. The polymerizable compounds preferably are selected so that after exposure, they yield the below described $T_g$ and refractive index.

A preferred polymerizable composition includes at least one multi-functional polymerizable compound and at least one other higher-order multi-functional polymerizable compound. For example, one polymerizable compound in the polymerizable composition may be a di-functional polymerizable compound while another polymerizable compound in the composition may be a tri-functional, tetra-functional, penta-functional, or higher functionality polymerizable compound. Preferably, the difference in functionality between at least one of the polymerizable compounds and at least one other polymerizable compound in the polymerizable composition is at least two, e.g., a di-functional compound and a tetra-functional compound, a tri-functional compound and a penta-functional compound, etc., or a mono-functional compound and a tri-functional or higher functionality compound.

In order to form cross-linked polymers, at least one polymerizable compound in the polymerizable composition must be at least di-functional. Monofunctional halogenated or non-halogenated monomers can also be used, but there may be some long-term outgassing or material migration of any non-reacted monomers of this type. By using monomers that are at least di-functional, the likelihood of a monomer not having at least partially reacted is dramatically reduced.

In polymerizable compositions including more than one polymerizable compound, the compounds are preferably present in roughly equal weight proportions. For example, in a two polymerizable-compound composition, the composition preferably includes from about 40 to about 60 wt. % of one compound and from about 40 to about 60 wt. % of the other compound, based on the total weight of the polymerizable compounds in the composition. More preferably, the composition includes from about 45 to about 55 wt. % of one compound and from about 45 to about 55 wt. % of the other compound, based on the total weight of the polymerizable compounds in the composition. Most preferably, the composition includes about 50 wt. % of each of the two polymerizable compounds based on the total weight of the polymerizable compounds. Similarly, in a three polymerizable-compound composition, the composition preferably includes from about 25 to about 40 wt. % of each of the three compounds based on the total weight of the polymerizable compounds in the composition. More preferably, the composition includes about 33 wt. % of each of the three polymerizable compounds based on the total weight of the polymerizable compounds in the polymerizable composition. Four or more polymerizable compounds may be formulated in a polymerizable composition, if desired.

An especially preferred polymerizable composition for making waveguide laminates is one including roughly equal weight proportions of two or more multi-functional polymerizable compounds at least two of which compounds differ in functionality by at least two. Such a polymerizable composition would preferably include an effective amount of one or more polymerization initiators. More preferably, the multi-functional polymerizable compounds differing in functionality would be photopolymerizable in the presence of an effective amount of one or more photoinitiators and an effective dosage of actinic radiation, such as ultraviolet light. Furthermore, the multi-functional polymerizable compounds in the composition would preferably polymerize at different rates.

The photopolymerizable compositions may be used to make partially cured waveguide laminates according to the methods described above. Diffraction gratings, e.g., Bragg diffraction gratings, can then be written in these partially cured waveguide laminates using a light source, such as a laser, and a phase mask or two-beam interference set-up. One such composition suitable for use in making Bragg diffraction gratings in planar polymeric waveguides is described at Example G below. Methods for writing gratings in the waveguide laminates will be disclosed in greater detail after describing the polymerizable compositions.

Photopolymerizable compounds are preferred for use in the polymerizable compositions. In particular, multifunctional acrylate monomers are preferred. The generalized structure of the multifunctional acrylates is given by structure (I):

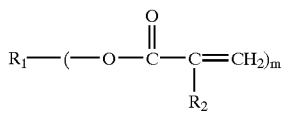
(I)

For the core, m preferably ranges from 1 to about 6; $R_2$ is H or $CH_3$, and $R_1$ may be a linkage of aliphatic, aromatic or aliphatic and aromatic mixed organic molecular segments. Preferably $R_1$ is an alkylene, alkylene oxide, arylene oxide, aliphatic polyether or polyester moiety and $R_2$ is H. To ensure solvent resistance of the cured film and high contrast photolithography, crosslinked polymers are preferred, so multifunctional acrylate monomers (m≧2) are preferred.

One of the embodiments of this invention decreases stress induced scattering optical loss of the final waveguiding device by using flexible, low glass transition temperature ($T_g$) polymers. It is known in the art that the glass transition temperature ($T_g$) of a crosslinked polymer depends on the crosslinking density and the structure of the linkage between crosslinking points. It is also known that both low crosslinking density and flexible linkage require a low $T_g$. To ensure low crosslinking density, monomers with 1≦m≦3, preferably m=2, and long linkage segments between two ethylenically unsaturated functionalities are preferred. For this invention, long linkage segments are those which have an average molecular chain length of at least about 4 carbon atoms or larger and preferably 6 or larger. Suitable flexible linkage structures include alkylenes with chain length larger than about 3 carbon atoms, poly(ethylene oxide), poly (propylene oxide), ethoxylated bisphenol A, polyethers, thioethers, aliphatic and aromatic hydrocarbons, ethers, esters and polysiloxanes, etc. These may optionally be substituted with any pendant group which does not substantially detract from the ability of the polymerizable compound to photopolymerize. Suitable substituents nonexclusively include alkyl, aryl, alkoxy and sulfoxide groups, etc. To ensure high resistance to thermal degradation and discoloration, thermally stable molecular structures of $R_1$ are preferred. Such $R_1$ segments are preferably substantially free of thermally susceptible moieties such as aromatic urethane and amide groups. To ensure low birefringence, $R_1$ linkages with low stress optic coefficient and optical polarizability are preferred.

For the cladding, the acrylate is also as described above, however, the average molecular chain length between ethylenically unsaturated functionalities is preferably about 6 carbon atoms or longer, preferably 8 or longer and more preferably 12 or longer. Suitable flexible linkage structures include alkylenes with chain, length larger than 6 carbon atoms, poly(ethyleneoxide), poly(propylene oxide) and ethoxylated bisphenol A.

Preferred polymerizable components for both the cladding and the core are esters and partial esters of acrylic acid and of aromatic and aliphatic polyols containing preferably 2 to 30 carbon atoms. The partial esters and esters of polyoxyalkylene glycols are also suitable. Examples are ethylene glycol diacrylate,, diethylene glycol diacrylate, triethylene glycol diacrylate, tetraethylene glycol diacrylate, polyethylene glycol diacrylates and polypropylene glycol diacrylates having an average molecular weight in the range from 200 to 2000, propylene glycol diacrylate, dipropylene glycol diacrylate, ($C_2$ to $C_{40}$) alkane diol diacrylates such as hexanediol diacrylate, and butanediol diacrylate, tripropylene glycol diacrylate, trimethylolpropane triacrylates, ethoxylated trimethylolpropane triacrylates having an average molecular weight in the range from 500 to 1500, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, sorbitol triacrylate, sorbitol tetraacrylate, sorbitol pentaacrylate, sorbitol hexaacrylate, oligoester acrylates, glycerol di- and triacrylate, 1,4-cyclohexane diacrylate, bisacrylates of polyethylene glycols having an average molecular weight from 100 to 1500, and mixtures of the above compounds. Preferred multifunctional acrylate oligomers include, but are not limited to acrylated epoxies, acrylated polyurethanes and acrylated polyesters. Preferred photopolymerizable compounds are aryl acrylates. Illustrative of such aryl acrylate monomers are aryl diacrylates, triacrylates and tetraacrylates as, for example, di, tri and tetraacrylates based on benzene, naphthalene, bisphenol-A, biphenylene, methane biphenylene, trifluoromethane biphenylene, phenoxyphenylene, and the like. The preferred aryl acrylate monomers are multifunctional aryl acrylates and more preferred aryl acrylate monomers are di, tri and tetra acrylates based on the bisphenol-A structure. Most preferred aryl acrylate monomers are alkoxylated bisphenol-A diacrylates such as ethoxylated bisphenol-A di-acrylate, propoxylated bisphenol A diacrylates and ethoxylated hexafluorobisphenol-A diacrylates. The aryl acrylate monomers of choice are ethoxylated bisphenol-A diacrylates: Preferred polymerizable components are monomers having the structure (II):

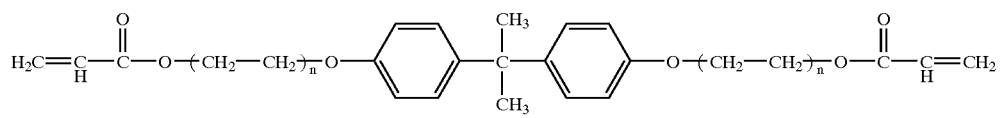
(II)

In a preferred embodiment, for the core, n is about 10 or less, preferably about 4 or less and most preferably about 2 or less. In one preferred embodiment, for the cladding, n is about 2 or more, preferably about 4 or more and most preferably about 10 or more. Also useful are acrylate-containing copolymers which are well known in the art. In one preferred embodiment, the cladding layer comprises a polymerizable component which has the ethoxylated bisphenol-A diacrylate structure (II) shown above wherein 1≦n≦20, preferably 4≦n≦15, and more preferably 8≦n≦12. In the most preferred embodiment of the invention, the second photosensitive composition is miscible with the polymerized first photosensitive composition at their interface.

Preferred polymerizable components for making low loss waveguides are multifunctional monomers having the structure (III):

A—R—R$_f$—R'—A (III)

where
R and R' are divalent or trivalent connecting groups selected from the group consisting of alkyl, aromatic, ester, ether, amide, amine, or isocyanate groups;

A is a polymerizable group, such as $$CY_2\!=\!C(X)COO\!-\!\text{ or } CH_2\!=\!CHO\!-\!\text{ or}$$

$$H_2C\!-\!\!\!\overset{\displaystyle\diagdown\!\!\!\diagup}{\underset{O}{}}\!\!\!-\!CH\!-\!\text{ or } H_2C\!-\!\!\!\overset{\displaystyle\diagdown\!\!\!\diagup}{\underset{O}{}}\!\!\!-\!CH\!-\!CH_2O\!-\!$$

where
Y=H or D, and
X=H, D, F, Cl or $CH_3$; and
$R_f$ is a perfluorinated substitutent, such as —$(CF_2)_x$—, where x is 1–10,
—$CF_2O$—[$(CF_2CF_2O)_m(CF_2O)_n$]—$CF_2$—,
—$CF(CF_3)O(CF_2)_4O[CF(CF_3)CF_2O]_pCF(CF_3)$—, or
—$CF_2O$—$(CF_2CF_2O)_m$—$CF_2$— where m and n designate the number of randomly distributed perfluoroethyleneoxy and perfluoromethyleneoxy backbone repeating subunits, respectively, and p designates the number of —$CF(CF_3)CF_2O$— backbone repeating subunits, where m, n, and p are integers 0, 1, 2, 3, . . . Preferably, x is 4–6.

Accordingly, the polymerizable compounds suitable for use in the invention include, for example, polydifluoromethylene diacrylates, perfluoropolyether diacrylates, perfluoropolyether tetraacrylates, and chloroflurodiacrylates. One suitable chlorofluorodiacrylate is the compound $$CH_2\!=\!CHCO_2CH_2CF_2(CFClCF_2)_nCH_2O_2CCH\!=\!CH_2.$$

One purpose in incorporating chlorine atoms in the structure is to raise the refractive index to that of a fully fluorinated compound without increasing the optical loss values.

In addition to the groups listed above, the polymerizable group A may also be a thiol group. Thiol-polyene UV curable systems can also be used. Without intending to be bound to any particular explanation for this curing system, the mechanism for the thiol-polyene reaction is generally understood as follows:

PI.+RSH→PI—H+RS.

RS.+$H_2C$=CHR'→RSCH$_2$—ĊHR'

RSCH$_2$—ĊHR'+RSH→RSCH$_2$—CH$_2$R'+RS.

In the first step of this reaction, a photoinitiator-generated free radical removes a proton from a thiol group to create a thiol radical. This thiol radical then reacts with a carbon double bond to create a radical intermediate. The radical intermediate then abstracts a proton from another thiol forming a thiol ether and another thiol radical. In this reaction, one thiol reacts with one carbon double bond. Also, for a polymer to develop, both the thiol and the alkene must be at least di-functional. In order to get a cross-linked polymer, it is necessary that at least one of the components be at least tri-functional.

The polymers generated by this reaction generally have good physical properties. Their shrinkage is also likely to be low. Unlike acrylates, this reaction is fairly insensitive to oxygen, but does have termination steps that occur when two radicals come together. These properties suggest that these materials may be able to produce reasonable lithographic resolution. The main problem with this approach is the availability of low-loss starting materials. Since these materials preferably formulated on a 1:1 thiol:alkene basis, varying refractive index requires at least three different compounds instead of two as exemplified elsewhere in this application.

When the perfluorinated substitutent group $R_f$ is

—$CF_2O$—[$(CF_2CF_2O)_m(CF_2O)_n$]—$CF_2$—, the ratio m/n preferably varies from about 0.5 to about 1.4. A sample of these materials will include a distribution of molecules having different numbers of repeating subunits. In such a sample, the average value of m preferably falls within the range of from about 6.45 to about 18.34, and the sample average value of n preferably falls within the range of from about 5.94 to about 13.93. Most preferably, the ratio m/n is about 1 and the sample average values of m and n are each about 10.3.

When the perfluorinated substitutent group $R_f$ is $CF_2O$—$(CF_2CF_2O)_m$—$CF_2$—, m is preferably 1 to 20, most preferably 8 to 16.

Preferably, the connecting group R is —$CH_2$— or —$CH_2C(A)HCH_2OCH_2$— and the connecting group R' is —$CH_2$— or —$CH_2OCH_2C(A)HCH_2$—, where A is defined as above. In light of this disclosure, the skilled artisan will recognize that a wide variety of connecting groups R and R' could be used in addition to those listed here.

A particularly preferred polymerizable compound for use in the invention has the structure $$CH_2\!=\!CHCO_2CH_2CHCH_2OCH_2CF_2O(CF_2CF_2O)_m(CF_2O)_nCF_2CH_2OCH_2CHCH_2O_2CCH\!=\!CH_2$$
$$\underset{O_2CCH=CH_2}{|}\qquad\qquad\qquad\underset{O_2CCH=CH_2}{|}$$

Preferably, the ratio m/n is about 1 and the molecular weight is between about 2000 and 2800.

When selecting the polymerizable compounds to be used in each of the core and the cladding, it is important that the core which results after full polymerization has a higher refractive index than that of the cladding after polymerization. Preferably the core has a refractive index in the range of from about 1.3 to about 1.6, or more preferably from about 1.35 to about 1.56. Preferably the cladding has a refractive index in the range of from about 1.29 to about 1.58, or more preferably from about 1.34 to about 1.55. Although the cladding and core may be comprised of structurally similar compositions, it is clear that in order for the cladding to have a refractive index which is lower than the refractive index of the core, they must have different chemical compositions for any individual application. In addition, as noted above, if the chosen substrate has a refractive index which is greater than that of the core, then a buffer layer is required and the buffer must have a refractive index which is lower than that of the core.

Figure 31:
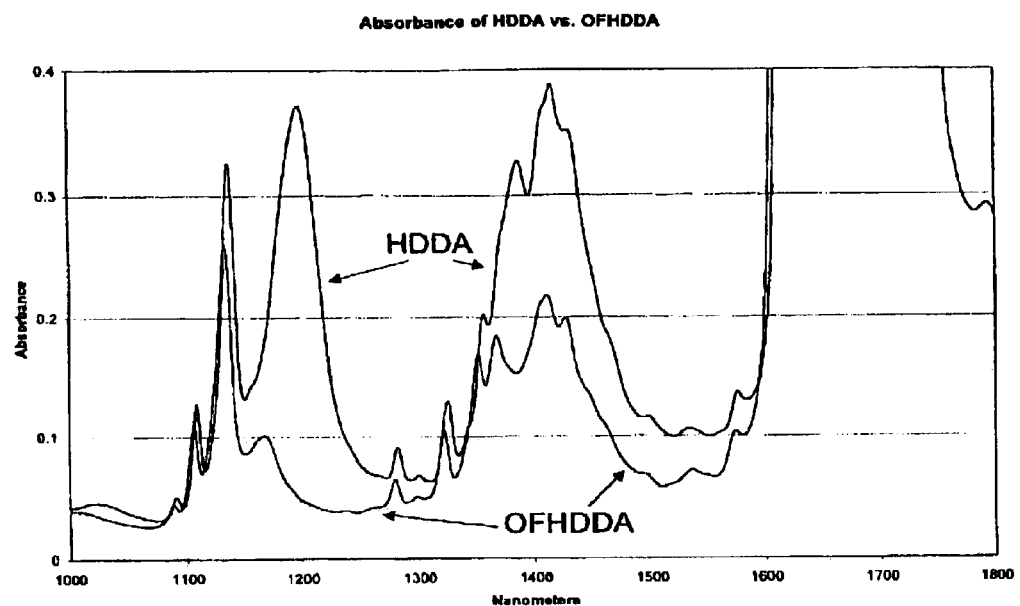
FIG. 31 shows absorption spectra for uncured liquid samples of hexanediol diacrylate and octafluorohexanediol diacrylate.
Figure 32:
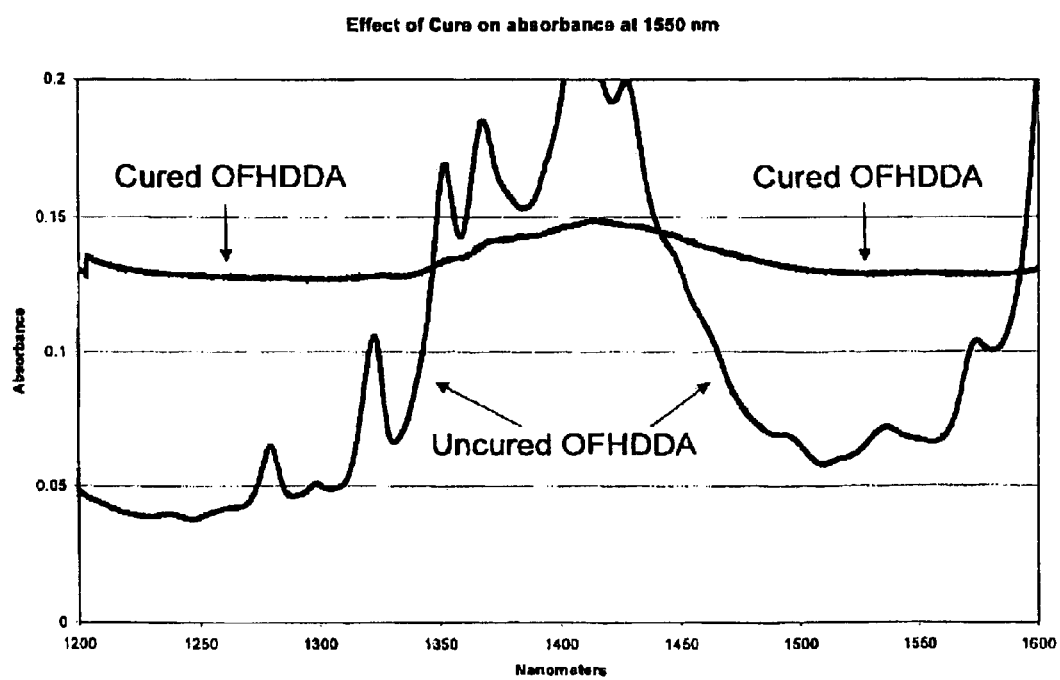
FIG. 32 shows absorption spectra for uncured liquid octafluorohexanediol diacrylate and cured octafluorohexanediol diacrylate.

In selecting other monomers and oligomers that may be suitable for forming planar light guiding devices, the following observations should be considered. For high purity fluorinated acrylates, the majority of the absorbance at 1550 nm is a result of carbon-to-hydrogen bonds. The absorption spectra for the non-fluorinated compound hexanediol diacrylate (HDDA) and the fluorinated compound octafluorohexanediol diacrylate (OFHDDA), in which eight hydrogen atoms are replaced by fluorine, as shown in FIG. 31, illustrate this point. The small peaks around the 1550 nm and 1310 nm regions of the spectra are characteristic of uncured liquids. After cure, virtually all of these fluctuations are eliminated, as shown in the spectrum of cured octafluorohexanediol diacrylate appearing at FIG. 32. Most of the elimination is probably due to the conversion of the carbon double bonds to carbon single bonds as the acrylate cures. Further, differences in the baseline absorbance values are believed to be the result of the higher level of scattering in the solid sample. Such scattering is an artifact of the way in which the sample was made and the thickness variation in the sample. Actual waveguide losses for this material would be substantially lower than indicated in FIG. 32.

In evaluating the relative merits of a particular acrylate based on its structure, it is useful to determine the molar concentration of hydrogen bonds for a particular candidate material. Since the absorption loss (in dB/cm) is determined by the relation $$\text{Absorption loss} = \frac{10 \cdot A}{b} = 10 \cdot \varepsilon c,$$

where A is the absorbance, $\varepsilon$ is the molar absorptivity, b is the path length in centimeters, and c is the molar concentration, the lower the molar concentration, the lower the absorption loss. Since almost all of the loss comes from carbon-to-hydrogen bonds, the molar concentration of hydrogen ($C_H$) for a particular monomer can be calculated using the number of hydrogens per molecule (H), the molecular weight of the monomer (Mw), and its density ($\rho$), as shown by the equation:

$$C_H = \frac{H \cdot \rho \cdot 1000}{Mw}$$

While an exact relationship between $C_H$ and the loss measurement in a particular waveguide is unlikely, this relation gives a first indication of which materials may be useful in lowering loss values. When making these calculations, it is most appropriate to use the sensitivity of a cured film of the monomer since it is the loss of the cured film that is of greatest interest. However, since the measure of density of such films is difficult, the density of the liquid could be used with the understanding that it does introduce some error.

Preferably, the photopolymerizable compounds to be used in the waveguide core produce a core which after polymerization has a glass transition temperature of about 80° C. or less and more preferably about 50° C. or less. Furthermore, it is preferred that the polymerizable compounds to be used in the waveguide cladding produce a cladding which after polymerization has a glass transition temperature of about 60° C. or less, more preferably about 40° C. or less and most preferably about 25° C. or less. Preferably, the polymerizable compounds included in the cladding polymerizable compositions are also photopolymerizable. The particular $T_g$ may be easily obtained by the skilled artisan by characterization and selection of the polymerizable component. This depends on such factors as the molecular weight, number of sites of unsaturation, and crosslink density of the polymerizable component. A single polymerized component may itself have the desired $T_g$, or the polymerizable component may be tailored by blending mixtures of polymerizable monomer, oligomers and/or polymers having the desired $T_g$. The $T_g$ may also be controlled by varying the irradiation exposure time and temperatures at which polymerization is conducted.

The polymerizable compound is present in each polymerizable composition in an amount sufficient to polymerize upon exposure to sufficient heat and/or actinic radiation. The amount of the photopolymerizable compound in the composition may vary widely and amounts normally used in photopolymerizable compositions for use in the preparation of photopolymers for use as the light transmissive element of light transmissive devices may be used. The amount of photopolymerizable compound is generally used in an amount of from about 35 to about 99.9% by weight of the composition. In the preferred embodiment, one or more photopolymerizable compounds in the overall photopolymerizable composition account for from about 80% to about 99.5% by weight, most preferably from about 95 to about 99.5% based on the weight of the overall composition.

Each light sensitive composition further comprises at least one photoinitiator. The photoinitiator can be a free radical generating addition polymerization initiator activated by actinic light and is preferably thermally inactive near room temperature, e.g., from about 20° C. to about 80° C. Any photoinitiator which is known to photopolymerize acrylates can be used. Preferred photoinitiators nonexclusively include those described in U.S. Pat. No. 4,942,112; quinoxaline compounds as described in U.S. Pat. No. 3,765,898; the vicinal polyketaldonyl compounds in U.S. Pat. No. 2,367,660; the alpha-carbonyls in U.S. Pat. Nos. 2,367,661 and 2,367,670; the acyloin ethers in U.S. Pat. No. 2,448,828; the triarylimidazolyl dimers in U.S. Pat. No. 3,479,185; the alpha-hydrocarbon substituted aromatic acyloins in U.S. Pat. No. 2,722,512; polynuclear quinones in U.S. Pat. Nos. 2,951,758 and 3,046,127; and s-triazines in U.S. Pat. No. 4,656,272. These patents are incorporated herein by reference.

Photopolymerizable compounds end-capped with at least one epoxy, acrylate, or methacrylate group can be initiated by a free radical type photoinitiator. Suitable free radical initiated type photoinitiators include aromatic ketones such as benzophenone, acrylated benzophenone, 2-ethylanthraquinone, phenanthraquinone, 2-tert-butylanthraquinone, 1,2-benzanthraquinone, 2,3-benzanthraquinone, 2,3-dichloronaphthoquinone, benzyl dimethyl ketal and other aromatic ketones, e.g., benzoin, benzoin ethers such as benzoin methyl ether, benzoin ethyl ether, benzoin isobutyl ether and benzoin phenyl ether, methyl benzoin, ethyl benzoin and other benzoins. Preferred photoinitiators are 1-hydroxy-cyclohexyl-phenyl ketone (Irgacure 184), benzoin, benzoin ethyl ether, benzoin isopropyl ether, benzophenone, 2,2-dimethoxy-2-phenylacetophenone (commercially available from CIBA-GEIGY Corp. as Irgacure 651), α,α-diethyloxy acetophenone, α,α-dimethyloxy-α-hydroxy acetophenone (Darocur 1173), 1-[4-(2-hydroxyethoxy)phenyl]-2-hydroxy-2-methyl-propan-1-one (Darocur 2959), 2-methyl-1-[4-methylthio)phehyl]-2-morpholino-propan-1-one (Irgacure 907), 2-benzyl-2-dimeiehylamino-1-(4-morpholinophenyl)-butan-1-one (Irgacure 369), poly{1-[4-(1-methylvinyl) phenyl]-2-hydroxy-2-methyl-propan-1-one} (Esacure KIP), [4-(4-methylphenylthio)-phenyl]phenylmethanone (Quantacure BMS), di-campherquinone. The most preferred photoinitiators are those which tend not to yellow upon irradiation. Such photoinitiators include benzodimethyl ketal (Irgacure 651), 2-hydroxy-2-methyl-1-phenyl-propan- 1-one (commercially available from Ciba-Geigy Corporation under the name Darocur 1173), 1-hydroxy-cyclohexyl-phenyl ketone (Irgacure-184), and 1-[4-(2-hydroxyethoxy)phenyl]-2-hydroxy-2-methyl-propan-1-one (Darocur 2959).

Photopolymerizable compounds end-capped with at least one vinyl ether group can be initiated by a radical cation type photoinitiator. Suitable radical cation type photoinitiators include various compounds which respond to irradiation by producing acid species capable of catalyzing cationic polymerization. See Crivello, Advances in Polymer Science, 62, p. 1–48 (1984). Onium salts of Group V, VI and VII elements are stated to be the most efficient and versatile of the cationic photoinitiators. They generate strong Lewis acids which can promote cationic polymerization. Curing of vinyl ether compositions is not limited to a particular class of such photoinitiators, although certain types are preferred, including onium salts based on halogens and sulfur. More specifically, the onium salt photoinitiators described in Crivello's U.S. Pat. No. 4,058,400 and in particular iodonium and sulfonium salts of $BF_4^-$, $PF_6^-$, $SbF_6^-$, and $SO_3CF_3^-$. Preferred photoinitiators are triarylsulfonium salts, and diaryliodonium salts. Preferred anions are hexafluorophosphate and hexafluoroantimony. They are usually required in amounts from about 0.1 to about 5 wt. %. Preferred initiators include:

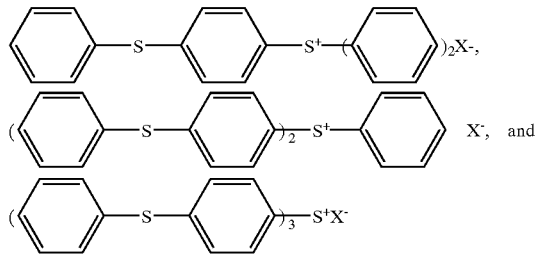

where X is $SbF_6^-$ or $PF_6^-$. Commercially available initiators include UVI-6974 (a SbF6⁻ salt) and UVI-6990 (a $PF_6^-$ salt) supplied by Union Carbide. Other cationic photoinitiators are defined by the formulas

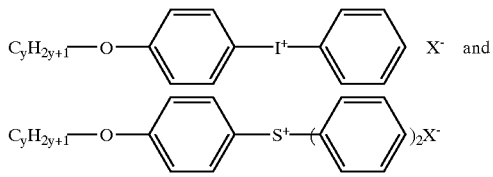

where y is 1 to 18.

The free radical or radical cation generating photoinitiator is present in each photopolymerizable composition in an amount sufficient to effect photopolymerization of the photopolymerizable compound upon exposure to sufficient actinic radiation. The photoinitiator is generally present in an amount of from about 0.01% to about 10% by weight of the overall composition, or more preferably from about 0.1% to about 6% and most preferably from about 0.5% to about 4% by weight based on the total weight of the composition.

Photopolymerizable compositions may include mixtures of polymerizable compounds end-capped with at least one actinic radiation curable group, such as the above-described epoxy or ethylenically unsaturated groups, specifically acrylate, methacrylate, and vinyl ether. Vinyl ethers can react with acrylates. Although acrylates and vinyl ethers do not ordinarily react with epoxies, mixed systems of vinyl ethers, acrylates, and epoxies can form interpenetrating networks if suitable photoinitiators are used. Accordingly, mixed systems can be used in making optical devices by the methods described here. Photoinitiators that are suitable for use in such mixed systems are described in U.S. Pat. No. 5,510,226, the disclosure of which is incorporated herein by reference.

For more highly fluorinated multifunctional acrylates, such as the fluorinated compound L-9367 available from 3M Specialty Chemicals Division, St. Paul, Minn., the structure of which is shown below, a preferred photoinitiator is a fluorinated photoinitiator such as those described in U.S. Pat. Nos. Re.35,060 and 5,391,587, the disclosures of which are incorporated herein by reference. In particular, a fluorinated photoinitiator having the structure (IV)

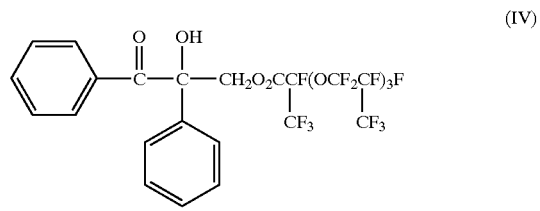

and described at Example 1 of Re. 35,060, may be used. It is also possible to cure the fluorinated materials of Examples A through D without photoinitiators through the use of electron beam curing.

It is possible to readily cure the polymerizable compounds, such as those described in the examples below, by heating them in the presence of a thermal type free radical polymerization initiator. While actinic radiation curing is preferred for the imagewise exposure steps described above, thermal curing could be used for any non-imagewise curing step. Suitable known thermal initiators include, but are not limited to, substituted or unsubstituted organic peroxides, azo compounds, pinacols, thiurams, and mixtures thereof. Examples of operable organic peroxides include, but are not limited to benzoyl peroxide, p-chlorobenzoyl peroxide and like diacyl peroxides; methyl ethyl ketone peroxide, cyclohexanone peroxide and like ketone peroxides; tert-butyl perbenzoate, tert-butyl peroxy-2-ethylhexoate and like peresters; tert-butyl hydroperoxide, cumene hydroperoxide and like hydroperoxides; di-tert-butyl peroxide, di-sec-butyl peroxide, dicumyl peroxide and like dialkyl peroxides; and diaryl peroxides. Other suitable organic peroxide include 2,5-dimethyl-2,5-di(t-butylperoxy)-hexane, 1,3-bis(t-butylperoxyisopropyl)benzene, 1,3-bis-(cumylperoxyisopropyl)benzene, 2,4-dichlorobenzoyl peroxide, caprylyl peroxide, lauroyl peroxide, t-butyl peroxyisobutyrate, hydroxyheptyl peroxide, di-t-butyl diperphthalate, t-butyl peracetate, and 1,1-di(t-butylperoxy)-3,3,5-trimethylcyclohexane. The organic peroxide is added to the composition in an amount ranging from 0.01–10%, preferably 0.1–5%, by weight based on the weight of the acrylate or methacrylate.

Suitable azo-type thermal curing initiators include 2,2'-azobisisobutyronitrile, 2,2'-azobis(2,4-dimethylvaleronitrile), (1-phenylethyl)azodiphenylmethane, 2,2'-azobis(4-methoxy-2,4-dimethylvaleronitrile), dimethyl-2,2'-azobis(1-cyclohexanecarbonitrile), 2-(carbamoylazo)-isobutyronitrile, 2,2'-azobis(2,4,4ntrimethylpentane), 2-phenylazo-2,4-dimethyl-4-methoxyvaleronitrile, 2,2'-azobis(2-methylpropane) and like azo compounds.

Other additives may also be added to the photosensitive compositions depending on the purpose and the end use of the light sensitive compositions. Examples of these include antioxidants, photostabilizers, volume expanders, free radical scavengers, contrast enhancers, nitrones and UV absorbers. Antioxidants include such compounds as phenols and particularly hindered phenols including tetrakis[methylene (3,5-di-tert-butyl-4-hydroxyhydrocinnamate)] methane (commercially available under the name Irganox 1010 from CIBA-GEIGY Corporation); sulfides; organoboron compounds; organophosphorous compounds; N,N'-hexamethylenebis(3,5-di-tert-butyl-4-hydroxyhydrocinnamamide) (available from Ciba-Geigy under the tradename Irganox 1098). Photostabilizers and more particularly hindered amine light stabilizers that can be used include, but are not limited to, poly[(6-morpholino-s-triazine-2,4-diyl)[2,2,6,6,-tetramethyl-4-piperidyl)imino]-hexamethylene[2,2,6,6,-tetramethyl-4-piperidyl)imino)] available from Cytec Industries under the tradename Cyasorb UV3346. Volume expanding compounds include such materials as the spiral monomers known as Bailey's monomer. Suitable free radical scavengers include oxygen, hindered amine light stabilizers, hindered phenols, 2,2,6,6-tetramethyl-1-piperidinyloxy free radical (TEMPO), and the like. Suitable contrast enhancers include other free radical scavengers such as nitrones. UV absorbers include benzotriazole, hydroxybenzophenone, and the like. These additives may be included in quantities, based upon the total weight of the composition, from about 0% to about 6%, and preferably from about 0.1% to about 1%. Preferably all components of the overall composition are in admixture with one another, and most preferably in a substantially uniform admixture.

When the radiation curable compounds described above are cured by ultraviolet radiation, it is possible to shorten the curing time by adding a photosensitizer, such as benzoin, benzoin methyl ether, benzoin ethyl ether, benzoin isopropyl ether, benzil (dibenzoyl), diphenyl disulfide, tetrame-thyl thiuram-monosulfide, diacetyl, azobisisobutyronitrile, 2-methyl-anthraquinone, 2-ethyl-anthraquinone or 2-tertbutyl-anthraquinone, to the monomer, oligomer, or polymer component or its solution. The proportion of the photosensitizer is preferably at most 5% by weight based on the weight of the curable compound.

As used herein "actinic radiation" is defined as light in the visible, ultraviolet or infrared regions of the spectrum, as well as electron beam, ion or neutron beam or X-ray radiation. Actinic radiation may be in the form of incoherent light or coherent light, for example, light from a laser. Sources of actinic light, and exposure procedures, times, wavelengths and intensities may vary widely depending on the desired degree of polymerization, the index of refraction of the photopolymer and other factors known to those of ordinary skill in the art. Such conventional photopolymerization processes and their operational parameters are well known in the art. Sources of actinic radiation and the wavelength of the radiation may vary widely, and any conventional wavelength and source can be used. It is preferable that the photochemical excitation be carried out with relatively short wavelength (or high energy) radiation so that exposure to radiation normally encountered before processing, e.g., room lights will not prematurely polymerize the polymerizable material. Alternatively, the processing can utilize a multiphoton process initiated by a high intensity source of actinic radiation such as a laser. Thus, exposure to ultraviolet light (300–400 nm wavelength) is convenient. Also, exposure by deep ultraviolet light (190–300 nm wavelength) is useful. Convenient sources are high pressure xenon or mercury-xenon arc lamps fitted with appropriate optical filters to select the desired wavelengths for processing. Also, short wavelength coherent radiation is useful for the practice of this invention. An argon ion laser operating in the UV mode at several wavelengths near 350 nm is desirable. Also, a frequency-doubled argon ion laser with output near 257 nm wavelength is highly desirable. Electron beam or ion beam excitation may also be utilized. Typical exposure times normally vary from a few tenths of seconds to about several minutes depending on the actinic source. Temperatures usually range from about 10° C. to about 60° C., however, room temperature is preferred.

Control of the spatial profile of the actinic radiation, that is, where it falls on the layer of photopolymerizable material may be achieved by conventional methods. For example, in one conventional method, a mask bearing the desired light transmissive pattern is placed between the source of actinic radiation and the photopolymerizable composition film. The mask has transparent and opaque regions which allow the radiation to fall only on the desired regions of the film surface. Masked exposure of thin films is well known in the art and may include contact, proximity and projection techniques for printing the light transmissive pattern onto the film. Another conventional method of spatial control is to use a source of actinic radiation which comprises a directed or focused beam such as a laser or electron beam. Such a beam intersects only a small area of the photo-polymerizable material film surface. The pattern of the desired light transmissive regions is achieved by moving this small intersection point around on the film surface either by scanning the beam in space or by moving the substrate so that the intersection point is changed relative to a stationary beam. These types of exposure using a beam source are known in the art as direct-write methods. By choosing the spatial characteristics of irradiation, it is possible to create light transmissive regions on the surface of the substrate and produce slab and channel waveguides. A slab waveguide is one in which the optical wave is confined only to the plane of the film. A channel waveguide is one in which the optical wave is also confined laterally within the film. A channel structure is necessary for many nonlinear and electro-optic devices because it allows the light to be directed to certain areas of the substrate as well as providing a mechanism for splitting, combining optical waves, coupling light from the waveguide to optical fibers, and maintaining the high intensity available in an optical fiber.

The method of this invention can be used for making a wide variety of optical elements. By using a suitable mask and by controlling the degree of collimation of the actinic radiation used for exposure, it is also possible to create arrays of micro-optical elements such as lenses or prisms which can be designed to transmit light in a direction roughly orthogonal to the substrate. Such optical element arrays find utility in application to backlights, e.g., for liquid crystal displays, projection systems, front or rear projection screens, diffusers, collimators, liquid crystal viewing screens, light directing arrays for collimators and lighting fixtures, exit signs, displays, viewing screens, displays for projection systems, and the like. For such applications it is important to create an essentially cosmetically perfect device composed of individual elements which have sharp definition and smooth walls. The composition of the current invention can be used to enhance the critical aspects of definition and wall smoothness. For some applications, the substrate may optionally be removed from the waveguide core and cladding.

The optical elements produced by the instant invention preferably have an optical loss at 1550 nm of about 0.1 dB/cm or less to about 0.5 dB/cm, more preferably less than about 0.3 dB/cm, even more preferably less than about 0.25 dB/cm, and most preferably less than about 0.20 dB/cm. In addition, the polymerized cladding, core and buffer layers preferably have a Gardner index as described by ASTM D 1544-80 of about 3 or less, more preferably about 2 or less and most preferably about 1 or less.

Device testing and modeling suggest a device lifetime (time for 0.1 dB/cm loss) of more than 10 years at 120° C. (operation temperature) and more than 1 hour at 250° C. (a typical device packaging temperature), thus allowing for use of devices made in accordance with this disclosure applicable in the aerospace, military, and telecommunications industries. Flexibility of the materials allows for fabrication of devices with desired bending angles. Cracking is also avoided even when the device is exposed to very high or very low temperatures. Good adhesion of the materials permits fabrication of robust devices on a variety of substrates without delamination even in some harsh environments such as high temperature and high humidity. Compatibility of device, fabrication techniques with those of the semiconductor industry allows for development of hybrid optoelectronic circuitry.

The following non-limiting examples serve to illustrate the invention. It will be appreciated that variations in proportions and alternatives in elements of the components of the photosensitive coating composition will be apparent to those skilled in the art and are within the scope of the present invention.

EXAMPLES

To synthesize the crosslinked photopolymers, the monomers or the oligomers were mixed with the photoinitiators and the antioxidant and well stirred. The solutions obtained were coated into thin liquid films by spin coating, slot coating or direct liquid casting with appropriate spacers. The thickness of the film was controlled by spinning speed or spacer thickness. The thickness of the films below 50 μm was measured with a Sloan Dektak IIA profilometer and the thickness of the thicker films were measured with a microscope.

Some of the fluorinated acrylates and methacrylates used in the examples of this invention are commercially available. For example, the fluorinated acrylates used in Examples C and D are available from 3M Specialty Chemicals Division, St. Paul, Minn. Alternatively, the fluorinated acrylates useful in this invention can be made from commercially available fluorinated polyols using methods generally known to those skilled in the art. The fluorinated polyol used in Example A, for example, is available from Ausimont USA, Inc., of Thorofare, N.J. Fluorinated acrylates can also be prepared from the polyol 2,2,3,3,4,4,5,5,-octafluoro-1,6-hexanediol available from Lancaster Synthesis, Inc., of Windham, N.H.

If the polymerizable compounds, such as acrylates, are synthesized from polyols, care should be taken to remove as much as practicable any residual alcohols or other hydroxyl group-bearing impurities since the hydroxyl group absorbs strongly in the spectral region of interest in telecommunications device applications, namely, in the 1300 to 1550 nm region. A preferred product purification technique is described in Example A.

Example A

A three-neck glass flask was fitted with a condenser and stirrer. Fluorolink® T brand fluorinated polyol (compound V, 900 g) and p-methoxyphenol (0.5 g) were added to the flask. The fluorinated polyol used in this example is a compound that can be described as having structure (V):

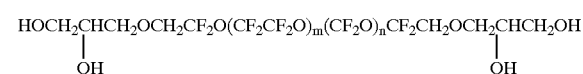

where the ratio m/n preferably varies from about 0.5 to about 1.4, m (average) varies from about 6.45 to about 18.34, and n (average) varies from about 5.94 to about 13.93. Most preferably, the ratio m/n is about 1 and m (average) and n (average) are each about 10.3.

Acryloyl chloride (170 g) was then added and the mixture was vigorously stirred. The resulting exotherm brought the temperature up to 70° C. The temperature was then raised to 90° C. and the reaction was run for three hours. The system, was then placed under vacuum to remove the HCl generated by the reaction and the excess acryloyl chloride. The mixture was then cooled to room temperature. The infrared spectrum of the batch confirmed the disappearance of the broad absorbance at 3500 cm$^{-1}$, which is attributed to hydroxyl groups on the polyol. Triethylamine (124 g) was then slowly added to the reaction flask over a ½-hour period. The sample was then filtered to remove triethyl amine hydrochloride which formed. The sample was then washed twice with water. The resulting tetraacrylate was isolated. The tetraacrylate product is a compound that can be described as having structure (VI):

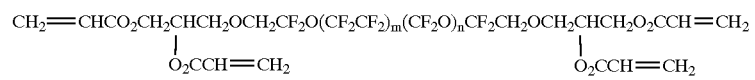

where the ratio m/n preferably varies from about 0.5 to about 1.4, m (average) varies from about 6.45 to about 18.34, and n (average) varies from about 5.94 to about 13.93. Most preferably, the ratio m/n is about 1 and m (average) and n (average) are each about 10.3.

Such compounds having structure (VI) are perfluoropolyether tetraacrylates. Because they are tetra-functional, they can also be useful in adjusting the crosslink density of the cured film to vary its physical properties. High molecular weight versions of this material can also be very low in loss while tending to have better solubility than some other materials described in this disclosure. Physical properties for one of these materials are shown in the table below.

| Molecular Weight | Liquid Refractive Index[a] | Cured Refractive Index[b] | Density | # of Hydrogens | $C_H$[c] |
|---|---|---|---|---|---|
| 2400 | 1.3362 | 1.335 | 1.663 | 26 | 18.0 |

[a] $n_D^{20}$
[b] Metricon 2010 prism coupler reading at 1550 nm for a cured film made using 1% photoinitiator.
[c] Molar concentration of hydrogen atoms in compound (described above)

Example B

Suitable monomers for use in this invention include polydifluoromethylene diacrylates having the generic structure: $CH_2=CHCO_2CH_2(CF_2)_nCH_2O_2CCH=CH_2$ where n is preferably 1–10. For this class of materials, the higher the value of n, the lower the refractive index, the lower the crosslink density, and the lower the absorbance. These materials tend to produce relatively hard films of high cross-link density. They also have excellent adhesive properties but have higher absorption losses than some of the other materials described in this application. The table below shows selected physical property values of two of these materials.

| # of Repeat Units (n) | Liquid Refractive Index[a] | Cured Refractive Index[b] | Density | # of Hydrogens | Molecular Weight | $C_H$[c] |
|---|---|---|---|---|---|---|
| 4 | 1.3920 | 1.4180 | 1.433 | 10 | 370 | 38.7 |
| 6 | 1.3797 | 1.4061 | 1.510 | 10 | 370 | 32.1 |

[a] $n_D^{20}$
[b] Metricon 2010 prism coupler reading at 1550 nm for a cured film made using 1% photoinitiator.
[c] Molar concentration of hydrogen atoms in compound (described above)

The compound octafluorohexanediol diacrylate was made as follows. A three-neck glass flask was fitted with a condenser. The polyol 2,2,3,3,4,4,5,5-octafluoro-1,6-hexanediol (OFHD, 300 g) obtained from Lancaster Synthesis of Windham, N.H., and p-methoxyphenol (0.5 g) were added to the flask. The flask was heated to 70° C. to melt the OFHD. Acryloyl chloride (228 g) was then added and the mixture was vigorously stirred. The resulting exotherm brought the temperature up to 90° C. The temperature was then held at 90° C. and the reaction was run for three hours. The system was then placed under vacuum to remove the HCl generated by the reaction and the excess acryloyl chloride. The mixture was then cooled to room temperature. The infrared spectrum of the batch confirmed the disappearance of the broad absorbance at 3500 cm$^{-1}$, which is attributed to hydroxyl groups on the polyol. Triethylamine (189 g) was then slowly added to the reaction flask over a ½-hour period. The sample was then filtered to remove the triethyl amine hydrochloride which formed. The sample was then washed twice with water. The remaining water was then stripped away under vacuum.

The reaction forming the octafluorohexanediol diacrylate compound (VII) from the polyol 2,2,3,3,4,4,5,5-octafluoro-1,6-hexanediol (compound VII) is depicted below:

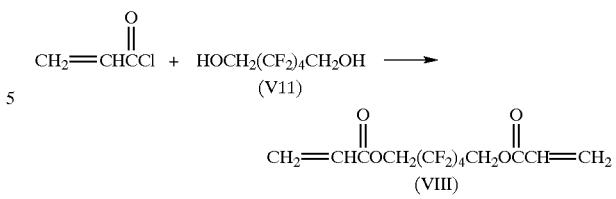

Example C

Another multifunctional acrylate that can be used in this invention include the fluorinated acrylate

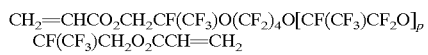

having the trade name L-12043 available from 3M Specialty Chemicals Division.

Example D

Another multifunctional acrylate that can be used in this invention include the fluorinated acrylate

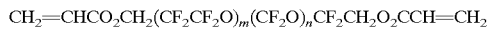

having the trade name L-9367 also available from 3M Specialty Chemicals Division.

Polymerizable monomers useful in practicing the invention can also be made from amino-terminated poly (perfluoroalkylene oxides), such as structure IX,

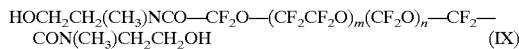

or from the diamine of structure X,

by reaction with an acrylic acid halide or anhydride in the presence of a tertiary amine.

In order to make suitable planar polymeric optical waveguides, it is preferred to finely control the refractive index of various core and cladding layers. While this can theoretically be achieved by tailoring the structure of a single monomer, oligomer, or polymer component used in a particular coating layer to achieve the desired refractive index, in practice, it is oftentimes easier to blend several monomers, oligomers, or polymer components of different refractive indices together to obtain the desired composite refractive index.

The refractive index of each of the polymerizable compounds made in Example A–B, or described above at Examples C–D, was measured by mixing each with 1% by weight of an appropriate photoinitiator. The mixtures were then spin coated onto a silicon wafer at a thickness of 5 to 10 microns. The samples were purged with nitrogen and cured to a hardened film with UV light. The refractive index of the films was then measured using a Metricon 2010 testing apparatus with a 1550 nm laser source in the TE mode. The results are tabulated in Table 2.

TABLE 2

| Sample | Refractive index at 1550 nm |
|---|---|
| A | 1.3519 |
| B | 1.4183 |
| C | 1.3454 |
| D | 1.3079 |

The samples were purged with nitrogen to remove oxygen, a known photopolymerization inhibitor, from the samples before photoinitiation. Alternatively, the container holding the samples can be evacuated to remove oxygen. Oxygen inhibition is generally not desired so that the polymerizable materials are substantially fully cured to produce cured materials having refractive index values that do not drift significantly over time or upon possible subsequent exposure to additional radiation. If desired, however, layers may be partially cured and, once the entire multi-layer structure is built, some or all layers may be cured further in a post-cure exposure step, as discussed above.

Using various mixtures of the Example A–D materials, it is possible to achieve a layer with a controlled refractive index lying between 1.3079 and 1.4183. It is also possible to extend this range further by using other materials that meet the chemical structure (III) defined above. Structures with $R_f$ groups that are larger or smaller than those in Examples A–D defined by Table 2 are likely to have refractive index values outside the range.

It is also possible to blend the monomers satisfying generic formula (III) with other monomers, such as the non-fluorinated compounds described above. Conventional (meth)acrylates, including non-fluorinated compounds, can have refractive index values ranging from about 1.4346 to about 1.5577, as shown in Table 3. The table lists refractive index values of various acrylate and methacrylate monomers provided by the Sartomer Company, of Exton, Pa. It is likely, however, that mixed systems including non-fluorinated monomers will be higher in loss than fully fluorinated systems.

TABLE 3

| Chemical Name | Sartomer Product | Refractive Index |
| --- | --- | --- |
| Isooctyl Acrylate | SR-440 | 1.4346 |
| 2-2(Ethoxyethoxy)ethyl Acrylate | SR-256 | 1.4355 |
| 2 (2-Ethoxyethoxy) Ethylacrylate | SR-256 | 1.4366 |
| Triethylene Glycol Diacetate | SR-322 | 1.4370 |
| Isodecyl Acrylate | SR-395 | 1.4395 |
| Isodecyl Methacrylate | SR-242 | 1.4414 |
| Lauryl Acrylate | SR-335 | 1.4416 |
| Lauryl Methacrylate | SR-313 | 1.4420 |
| Isodecyl Acrylate | SR-395 | 1.4431 |
| Propoxylated Neopentyl Glycol Diacrylate | SR-9003 | 1.4464 |
| Alkoxylated Difunctional Acrylate Ester | SR-9040 | 1.4470 |
| Glycidyl Methacrylate | SR-379 | 1.4470 |
| Glycidyl Methacrylate | SR-379 | 1.4470 |
| Propoxylated Neopentyl Glycol Diacrylate | SR-9003 | 1.4470 |
| Alkoxylated Difunctional Acrylate Ester | SR-9040 | 1.4470 |
| Tridecyl Methacrylate | SR-493 | 1.4472 |
| Tridecyl Acrylate | SR-489 | 1.4474 |
| Caprolactone Acrylate | SR-495 | 1.4483 |
| Tripropylene Glycol Diacrylate | SR-306 | 1.4485 |
| Stearyl Methacrylate | SR-324 | 1.4485 |
| Tris (2-Hydroxy Ethyl) Isocyanurate Triacrylate | SR-368 | 1.4489 |
| 1,3-Butylene Glycol Dimethacrylate | SR-297 | 1.4489 |
| 1,3-Butylene Glycol Diacrylate | SR-212 | 1.4501 |
| Neopentyl Glycol Diacrylate | SR-247 | 1.4503 |
| Neopentyl Glycol Dimethacrylate | SR-248 | 1.4510 |
| Adhesion Promoting Monofunctional Acid Ester | CD-9050 | 1.4513 |
| Ethylene Glycol Dimethacrylate | SR-206 | 1.4522 |
| Alkoxylated Aliphatic Diacrylate Ester | SR-9209 | 1.4533 |
| 1,4-Butanediol Diacrylate | SR-213 | 1.4535 |
| 1,4-Butanediol Dimethacrylate | SR-214 | 1.4545 |
| C14–C15 Acrylate Terminated Monomer | SR-2000 | 1.4548 |
| 1,4-Butanediol Dimethacrylate | SR-214 | 1.4548 |
| Tetrahydrofurfuryl Methacrylate | SR-203 | 1.4553 |
| Hexanediol Diacrylate | SR-238 | 1.4553 |
| 1,6-Hexanediol Dimethacrylate | SR-239 | 1.4556 |
| 1,6-Hexanediol Diacrylate | SR-238 | 1.4560 |
| Tetrahydrofurfuryl Acrylate | SR-285 | 1.4563 |
| Hexanediol Dimethacrylate | SR-239 | 1.4565 |
| Propoxylated Trimethylolpropane Triacrylate | SR-501 | 1.4567 |
| Cyclohexyl Acrylate | SR-208 | 1.4567 |
| Highly Propoxylated Glyceryl Triacrylate | SR-9021 | 1.4575 |
| Tetrahydrofurfuryl Acrylate | SR-203 | 1.4575 |
| Cyclohexyl Methacrylate | SR-220 | 1.4575 |
| Tetrahydrofurfuryl Acrylate | SR-285 | 1.4577 |
| Triethylene Glycol Dimethacrylate | SR-205 | 1.4580 |
| C14–C15 Methacrylate Terminated Monomer | SR-2100 | 1.4585 |
| Tetraethylene Glycol Dimethacrylate | SR-209 | 1.4587 |
| Propoxylated$_3$ Trimethylolpropane Triacrylate | SR-492 | 1.4590 |
| Diethylene Glycol Diacrylate | SR-230 | 1.4590 |
| Polyethylene Glycol Dimethacrylate | SR-210 | 1.4598 |
| Propoxylated Glyceryl Triacrylate | SR-9020 | 1.4605 |
| Triethylene Glycol Diacrylate | SR-272 | 1.4606 |
| Diethylene Glycol Dimethacrylate | SR-231 | 1.4607 |
| Highly Propoxylated Glyceryl Triacrylate | SR-9021 | 1.4610 |
| Propoxylated Glyceryl Triacrylate | SR-9020 | 1.4612 |
| Tetraethylene Glycol Diacrylate | SR-268 | 1.4621 |

TABLE 3-continued

| Chemical Name | Sartomer Product | Refractive Index |
|---|---|---|
| Caprolactone Acrylate | SR-495 | 1.4637 |
| Polyethylene Glycol (200) Diacrylate | SR-259 | 1.4639 |
| Polyethylene Glycol (400) Dimethacrylate | SR-603 | 1.4645 |
| Di-trimethylolpropane Tetraacrylate | SR-355 | 1.4654 |
| Polyethylene Glycol (600) Dimethacrylate | SR-252 | 1.4655 |
| Polyethylene Glycol (400) Diacrylate | SR-344 | 1.4655 |
| Polyethylene Glycol (600) Dimethacrylate | SR-252 | 1.4666 |
| Polyethylene Glycol (600) Diacrylate | SR-610 | 1.4676 |
| Ethoxylated Trimethylolpropane Triacrylate | SR-454 | 1.4686 |
| Ethoxylated$_3$ Trimethyolopropane Triacrylate | SR-454 | 1.4689 |
| Ethoxylated$_6$ Trimethylolpropane Triacrylate | SR-499 | 1.4691 |
| Ethoxylated$_9$ Trimethylolpropane Triacrylate | SR-502 | 1.4692 |
| Adhesion Promoting Trifunctional Acid Ester | CD-9051 | 1.4692 |
| Ethoxylated$_{15}$ Trimethylolpropane Triacrylate | SR-9035 | 1.4695 |
| Alkoxylated Trifunctional Acrylate Ester | SR-9008 | 1.4696 |
| Ethoxylated Trimethylolpropane Triacrylate | SR-9035 | 1.4697 |
| Ethoxylated$_{20}$ Trimethylolpropane Triacrylate | SR-415 | 1.4699 |
| Trimethylolpropane Trimethacrylate | SR-350 | 1.4701 |
| Ethoxylated Trimethylolpropane Triacrylate | SR-415 | 1.4705 |
| Ethoxylated Pentaerythritol Triacrylate | SR-494 | 1.4711 |
| Isobornyl Acrylate | SR-506 | 1.4722 |
| Trimethylolpropane Triacrylate | SR-351 | 1.4723 |
| Trifunctional Methacrylate Ester | SR-9010 | 1.4723 |
| Trifunctional Methacrylate Ester | SR-9010 | 1.4723 |
| Trifunctional Methacrylate Ester | SR-9011 | 1.4724 |
| Isobornyl Acrylate | SR-506 | 1.4738 |
| Isobornyl Methacrylate | SR-423 | 1.4738 |
| Isobornyl Methacrylate | SR-423 | 1.4740 |
| Saret Crosslinking Agent (Trifunctional) | SARET 500 | 1.4751 |
| Sarit Crosslinking Agent (Trifunctional) | SR-500 | 1.4751 |
| Di-Trimethylolpropane Tetraacrylate | SR-355 | 1.4758 |
| Aromatic Acid Methacrylate Half Ester In Trifunctional Methacrylate Monomer | SB-600 | 1.4767 |
| Pentaerythritol Triacrylate | SR-444 | 1.4790 |
| Aliphatic Urethane Acrylate | CN-965 | 1.4800 |
| Pentaerythritol Triacrylate | SR-444 | 1.4801 |
| Aromatic Urethane Acrylate | CN-972 | 1.4810 |
| Aliphatic Urethane Acrylate | CN-962 | 1.4812 |
| Low Viscosity Aliphatic Diacrylate Oligomer | CN-132 | 1.4817 |
| Epoxidized Soy Bean Oil Acrylate | CN-111 | 1.4821 |
| Pentaerythritol Tetraacrylate | SR-295 | 1.4823 |
| Pentaerythritol Tetraacrylate | SR-295 | 1.4847 |
| Dipentaerythritol Pentaacrylate | SR-399 | 1.4885 |
| Pentaacrylate Ester | SR-9041 | 1.4887 |
| Pentaerythritol Pentaacrylate | SR-399 | 1.4889 |
| Low Viscosity Aliphatic Triacrylate Oligomer | CN-133 | 1.4896 |
| Pentaacrylate Ester | SR-9041 | 1.4899 |
| Aromatic Acid Methacrylate Half Ester In EEP Ester Solvent | SB-401 | 1.4905 |
| Highly Ethoxylated$_{30}$ Bisphenol A Dimethacrylate | CD-9036 | 1.4906 |
| Aliphatic Urethane Acrylate | CN-981 | 1.4916 |
| Aromatic Acid Methacrylate Half Ester in PM Alcohol Solvent | SB-400 | 1.4921 |
| Aliphatic Urethane Acrylate | CN-980 | 1.4931 |
| Ethoxylated Nonylphenol Acrylate | SR-504 | 1.4936 |
| Aromatic Acid Methacrylate Half Ester In SR454 | SB-500E50 | 1.5010 |
| Aromatic Acid Acrylate Half Ester in SR454 | SB-520E35 | 1.5022 |
| Aromatic Acid Methacrylate Half Ester in SR344 | SB-500K60 | 1.5029 |
| Phenoxyethyl Methacrylate | SR-340 | 1.5100 |
| 2-Phenoxyethyl Methacrylate | SR-340 | 1.5109 |
| Highly Ethoxylated$_{10}$ Bisphenol A Dimethacrylate | SR-480 | 1.5112 |
| Ethoxylated$_{10}$ Bisphenol A Diacrylate | SR-602 | 1.5142 |
| Phenoxyethyl Acrylate | SR-339 | 1.5151 |
| 2-Phenoxyethyl Acrylate | SR-339 | 1.5160 |
| Ethoxylated$_6$ Bisphenol A Dimethacrylate | CD-541 | 1.5227 |
| Low Viscosity Aromatic Monoacrylate Oligomer | CN-131 | 1.5259 |
| Stearyl Acrylate | SR-257 | 1.5312 |
| Ethoxylated$_4$ Bisphenol A Dimethacrylate | CD-540 | 1.5315 |
| Ethoxylated$_4$ Bisphenol A Diacrylate | SR-601 | 1.5340 |
| Ethoxylated Bisphenol A Dimethacrylate | SR-348 | 1.5389 |
| Ethoxylated$_2$ Bisphenol A Dimethacrylate | SR-348 | 1.5424 |
| Ethoxylated Bisphenol A Diacrylate | SR-349 | 1.5424 |
| Ethoxylated$_2$ Bisphenol A Diacrylate | SR-349 | 1.5425 |
| Epoxy Acrylate | CN-120 | 1.5558 |
| Epoxy Acrylate | CN-104 | 1.5577 |

In addition, it is also possible to include the use of dissolved thermoplastic materials in these formulations. The use of either alternative monomers and/or polymers is limited strictly by their compatibility with the cured materials of this invention.

Comparative Example 1

A straight waveguide was made using the following procedure. A clean silicon wafer was silane treated by spin coating to provide an adhesive tie layer for acrylate formulations. The treated wafer was spin coated with a lower cladding polymerization composition including the amounts indicated of the polymerizable compounds, photoinitiator, and antioxidant listed on the table below. The thickness of the lower cladding layer was equal to or greater than about 10 µm thick. The assembly was then cured with UV light while blanketed with nitrogen. A core polymerizable composition was formulated including the amounts indicated of the polymerizable compounds, photoinitiator, and antioxidant set forth in the table below. The core polymerizable composition was then spin coated on top of the lower cladding layer. The core polymerizable composition was formulated such that it would have a higher refractive index than the lower cladding layer. The thickness of the core layer depended on the desired height of the waveguide, which typically ranged from about 5 to about 9 microns for single mode guides. The core polymerizable composition was then exposed to UV light through a photomask. The unexposed material was then removed by solvent. An upper cladding layer, which was typically made from the same material used in the lower cladding layer, was then coated on top of the core layer. The preferred method of coating was spin coating. The upper cladding composition was then cured.

| Comparative Example 1 | | |
|---|---|---|
| Ingredient or Property | Core | Cladding wt % |
| Sartomer SR349 | 10.0 wt. % | — |
| Sartomer SR238 | 5.0 wt. % | — |
| Sartomer SR610 | 27.6 wt. % | 32.6 wt. % |
| Sartomer SR306 | 55.1 wt. % | 65.2 wt. % |
| Irgacure 651 photoinitiator | 1.0 wt. % | 1.0 wt. % |
| Irganox 1010 antioxidant | 0.3 wt. % | 0.3 wt. % |
| Refractive Index (at 1550 nm) | 1.4980 | 1.4928 |
| $T_g(°C.)$ | 11 | — |

Example E

The procedure used for making the Comparative Example 1 optical element was repeated using the formulations listed in the following table:

| Example E | | |
|---|---|---|
| Ingredient or Property | Core | Cladding wt % |
| Product made in Example B | 13 wt. % | — |
| L-12043 available from 3M Specialty Chemicals Division | 86 wt. % | 99 wt. % |
| Photoinitiator (compound IV) | 1.0 wt. % | 1.0 wt. % |
| Refractive Index (at 1550 nm) | 1.3562 | 1.3471 |
| $T_g(°C.)$ | 32 | (see note 1) |

Note 1:
The $T_g$ values of the core layers were determined by dynamic mechanical analysis. The $T_g$ values of the cladding layers were not determined, but they are expected to be nearly the same as that of the core.

Example F

The procedure used for making the Comparative Example 1 optical element was repeated using the formulations listed in the following table:

| Example F | | |
|---|---|---|
| Ingredient | Core | Cladding |
| Product made in Example A | 60 wt. % | 30 wt. % |
| L-9367 (available from 3M Specialty Chemicals Division) | 38 wt. % | 68 wt. % |
| Compound (IV) photoinitiator | 2.0 wt. % | 2.0 wt. % |
| Refractive Index (at 1550 nm) | 1.3249 | 1.3188 |
| $T_g(°C.)$ | −8 | (see note 1) |

Note 1:
The Tg values of the core layers were determined by dynamic mechanical analysis. The Tg values of the cladding layers were not determined, but they are expected to be nearly the same as that of the core.

Example G

A straight waveguide was made using the following procedure. Unoxidized silicon wafers were cleaned by the Standard Clean 1 (SC1) process. Standard Clean 1 is a well-known chemical combination that is used to clean bare silicon or a silicon wafer with thermally grown or deposited oxide. The cleaning process entailed dipping the wafers into a 1:5:1 solution of ammonium hydroxide:water:30% hydrogen peroxide. The temperature of the solution was then raised to 70° C. for ½-hour. The wafers were then rinsed in deionized water. The wafer was then treated with 3-acryloxypropyltrichloro silane (Gelest Inc., Tullytown, Pa.) by applying it onto the wafer using a clean room swab. Excess 3-acryloxypropyltrichloro silane was rinsed off with ethanol followed by a light wiping with a clean room cloth to remove particles. The wafer was then dried on a hot plate set at a surface temperature of 70° C.

The lower cladding polymerizable composition was formulated per the table below, and filtered at 0.1 microns. A quantity (1.0 ml) of this composition was applied to the wafer while it sat centered on the chuck of a spin coater (available from Cost Effective Equipment division of Brewer Science, Inc., Rolla, Mo., USA). The material was spun to obtain a 10 micron thick layer. This entailed a 100 rpm spread for 30 seconds followed by a ramp at 100 rpm/sec to 750 rpm for 60 seconds. The sample was then placed in a purge box and flooded with nitrogen for two minutes at a flow of 7.1 liters per minute. The sample was then exposed at 10.4 W/cm² through a 3° diffuser using a Tamarack light source. The sample was then reloaded onto the spin coater. The core polymerizable composition formulated according to the table below was then filtered as above and 1.5 ml was dispensed onto the wafer. The wafer was then spun at a 100 rpm spread for 30 seconds followed by a ramp at 100 rpm/sec to 1350 rpm for 60 seconds to yield a 6 micron thick layer. The sample was then placed in a vacuum bell jar and evacuated to 0.2 torr to remove bubbles. The photomask was then brought in contact with the sample under vacuum and held for 1 minute. The vacuum was then released and the sample was placed in a purge box as above and exposed at 11.9 mW/cm² for 20 seconds. The mask was removed and the wafer was placed again on the spinner. The sample was spun at 1100 rpm and was developed for 90 seconds using 8 ml of Galden® HT110 perfluorinated ether solvent obtained from Ausimont USA. The sample was then coated with an upper layer of cladding material in the same manner as the lower cladding layer except that the cure was for 60 seconds at 9.3 mW/cm².

Example G

| Ingredient or Property | Core | Cladding |
| --- | --- | --- |
| Product of Example A | 49.5 wt. % | 55.9 wt. % |
| Product of Example B | 49.5 wt. % | 43.1 wt. % |
| Darocur 1173 photoinitiator | 1.0 wt. % | 1.0 wt. % |
| Refractive Index (at 1550 nm) | 1.3786 | 1.3723 |
| $T_g$(° C.) | 30 | (see note 1) |

Note 1:
The $T_g$ values of the core layers were determined by dynamic mechanical analysis. The $T_g$ values of the cladding layers were not determined, but they are expected to be nearly the same as that of the core.

The cured composition Example G material exhibits low dispersion, i.e., on the order $10^{-6}$ at 1550 nm, low birefringence ($\equiv 10^{-4}$), and high environmental stability.

The total loss through single mode waveguides made from different materials was measured as a function of the length of the waveguide. Using these results, it was possible to determine the loss through the material.

Figure 30:
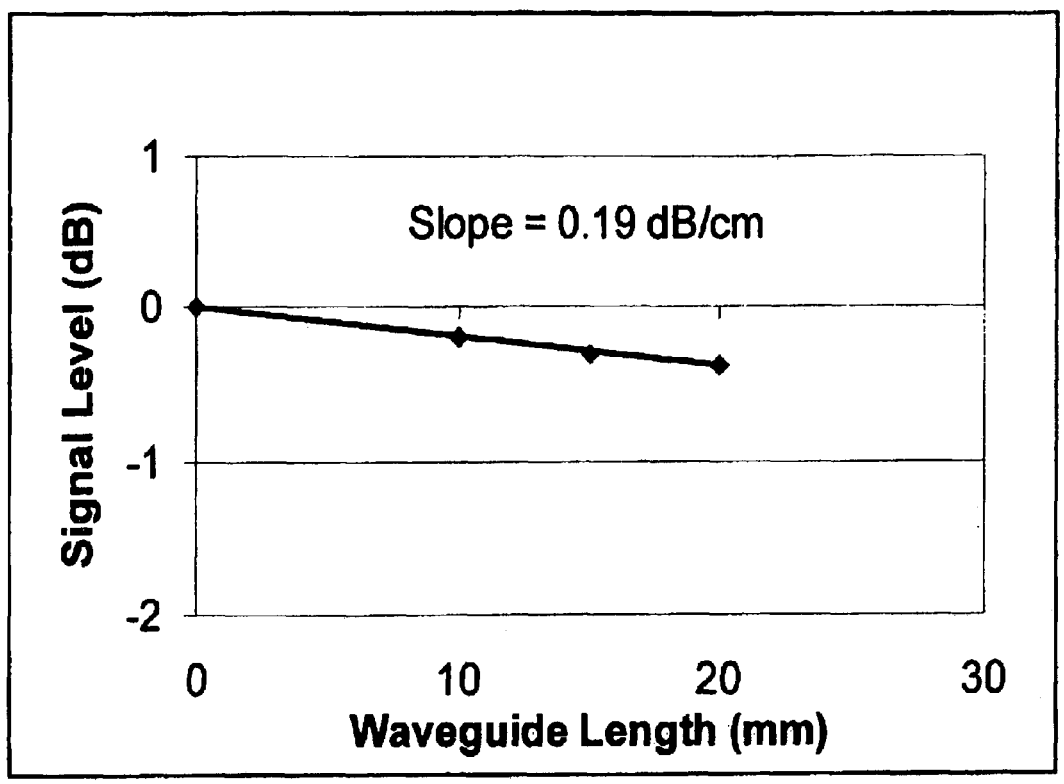
FIG. 30 is a graph showing the dependence of signal level on waveguide length for an optical waveguide made in accordance with the invention.

Loss measurements of a waveguide made using the Example E core and cladding are shown in FIG. 30. The loss was measured through a 20 mm long waveguide. The guide was then cleaved to produce a 15 mm guide and the loss was re-measured. The guide was then finally cleaved again to produce a 10 mm guide. An extrapolated point of zero loss at zero length was then added to the graph. The slope of the line was determined and recorded in decibels per centimeter (dB/cm). Table 4 tabulates the results for each of Comparative Example 1 and Examples E–G.

TABLE 4

| Sample | dB/cm @ 1550 nm |
| --- | --- |
| Comparative Example 1 | 0.75 |
| Example E | 0.29 |
| Example F | 0.19 |
| Example G | 0.24 |

As can be seen from the loss results for Example E, F, and G, the use of fluorinated alkyl or fluorinated ether acrylates is capable of producing waveguides with very low propagation losses compared to those of conventional materials.

The materials from Examples E, F and G also exhibited no measurable polarization dependence when tested using a Metricon 2010 prism coupling-refractive index measuring device in both the TE and TM modes at 1550 nm. The results observed imply a refractive index difference between the TE and TM polarizations of less than 0.0001, the measurement sensitivity of the testing instrument. The results for the invention compare to differences of 0.008 (at 1.3 $\mu$m wavelength light) for high $T_g$ fluorinated polyimides, as reported in U.S. Pat. No. 5,598,501. While fluorinated polyimides exhibit low loss, their birefringence is a clear disadvantage to their use. As is known in the art, a birefringent material has different refractive indices depending on orientation of the material. Since the operation of devices, such as thermo-optic switches, directional couplers, and the like depends on small refractive index differences, the operation may be different for TE and TM polarizations in highly birefringent materials. This is generally unacceptable since the light coming into the device will have an unknown state of polarization. The virtual absence of polarization dependence in Examples E, F, and G indicates that these materials are capable of low loss and can produce waveguides with minimal polarization losses and shifts.

Example H

The following procedure was performed to test the assumption that a liquid material undergoing a rapid curing process is less likely to result in physical stress than a dried thermoplastic.

A UV-coating made solely of ethoxylated bisphenol A diacrylate (EBDA, Sartomer 349 from Sartomer Company, Exton, Pa.) with 1% photoinitiator was spin coated on a silicon wafer and fully cured with UV light to produce a 10 micron thick-layer. Another silicon wafer was coated with Joncryl 130 (S. C. Johnson Polymer, Racine, Wis.), an aqueous styrenated acrylic copolymer and dried for 10 minutes at 70° C. Both materials have a glass transition temperature of 62° C. Both materials also possess both aromatic and aliphatic chemical groups. The cured film of the EBDA is highly cross-linked, while the dried film of the Joncryl 130 is thermoplastic. One of ordinary skill would normally assume that a polymer that is highly cross-linked would be under a lot more stress than a thermoplastic polymer. This should result in a greater difference between TE and TM refractive index measurements. In fact, the opposite is true as shown below:

| | Before Annealing | | After Annealing | |
| --- | --- | --- | --- | --- |
| | EBDA | Joncryl 130 | EBDA | Joncryl 130 |
| Avg. TE | 1.54518 | 1.53968 | 1.54562 | 1.5397 |
| Avg. TM | 1.54486 | 1.54020 | 1.54542 | 1.5405 |
| Difference | −0.00032 | 0.00052 | −0.0001 | 0.0008 |
| ANOVA P-Value | 0.32223 | 0.02602 | 0.2565 | 0.0008 |

The table above shows the average of 10 readings for TE and TM for both materials using a Metricon 2010 Prism Coupler. The difference between the average TE and TM readings was determined and an analysis of variance (ANOVA) was performed to determine if the difference was statistically significant. Before annealing, the EBDA sample had a difference between TE and TM of −0.00032, however, the high P-value indicates that this result is not statistically significant. It is essentially below the error limits of what the experiment could measure. The Joncryl 130 material had a difference of 0.00052. Unlike the EBDA sample, this difference was highly statistically significant. After annealing for two hours at 70° C., the difference of TE and TM for EBDA decreased slightly and remained statistically insignificant. The Joncryl 130 material, however, actually increased in difference between TE and TM and remained statistically significant. As noted above, the Joncryl 130 is a thermoplastic that does have any of the additional stress that would be associated with a subsequent cross-linking step. When this experiment was repeated with a cross-linkable, solid epoxy novalac resin (Epon SU-8, Shell Chemical, Houston Tex.), which has been used to make optical waveguides, as disclosed in U.S. Pat. No. 5,054,872, the difference between TE and TM was found to be greater than 0.001 regardless of annealing conditions.

As a result of this test, liquid photocurable compositions are preferred over solid thermoplastic photocurable polymers dissolved in solvents.

Example I

Perfluoropolyether diacrylates, such as those described by the generic formula

may be used in practicing the invention. For these materials, the values of both m and n can vary considerably. Final molecular weights of these materials can vary between about 500 and 4000. The higher the values for m and n, the lower the refractive index, the lower the crosslink density, and the lower the absorption loss. As can be seen from the refractive indexes and the $C_H$ values given in the table below, these materials can be very highly fluorinated. While it is desirable to use as much fluorination as possible for loss purposes, such highly fluorinated materials can cause difficulty in adhesion when applying subsequent layers, such as electrodes. In addition, these materials have relatively limited solubility with other less fluorinated materials. For the higher molecular weight varieties, fluorinated photoinitiators, such as those described in U.S. Pat. Nos. 5,391,587 and Reissue Pat. No. 35,060, should be used. These materials also produce extremely soft films. Glass transition temperatures for these materials can be as low as −90° C.

| Molecule Weight | Liquid Refractive Index[a] | Cured Refractive Index[b] | Density | # of Hydrogens | $C_H$[c] |
|---|---|---|---|---|---|
| 1100 | 1.3239 | 1.3389 | 1.649 | 10 | 15.0 |
| 2100 | 1.3090 | 1.3079 | 1.749 | 10 | 8.3 |

[a]$n_D^{20}$
[b]Metricon 2010 prism coupler reading at 1550 nm for a cured film made using 1% photoinitiator.
[c]Molar concentration of hydrogen atoms in compound (described above)

Example J

A chlorofluorodiacrylate compound having the structure $$CH_2=CHCO_2CH_2CF_2(CFClCF_2)_4CH_2O_2CCH=CH_2$$

can be used in practicing the invention. The compound has the properties listed in the table below.

| Liquid Refractive Index[a] | Cured Refractive Index[b] | Density | # of Hydrogens | Molecular Weight | $C_H$[c] |
|---|---|---|---|---|---|
| 1.4216 | 1.4416 | 1.580 | 10 | 684 | 23.1 |

[a]$n_D^{20}$
[b]Metricon 2010 prism coupler reading at 1550 nm for a cured film made using 1% photoinitiator.
[c]Molar concentration of hydrogen atoms in compound (described above)

Example K

Monofunctional fluorinated acrylates having the generic structure $$CF_3(CF)_n(CH_2)_mO_2CCH=CH_2$$

where m is typically 1 or 2 and n can range from 0 to 10 or higher, may be used to practice the invention. Typical property values for the material where n=8 and m=2 are shown in the table below. For this material, the higher the value of n, the lower the refractive index, glass transition temperature, and absorption loss. As noted above, while monofunctional monomers can be used in the invention, there may be some long-term outgassing or material migration of any non-reacted monomers of this type. To avoid the possibility of a monofunctional monomer not having at least partially reacted, higher radiation dosages for longer periods of time may be required to assure sufficient cure of these materials. Such efforts are generally not required using multi-functional monomers.

| Liquid Refractive Index[a] | Cured Refractive Index[b] | Density | # of Hydrogens | Molecular Weight | $C_H$[c] |
|---|---|---|---|---|---|
| 1.3387 | 1.3325 | 1.6 | 7 | 569 | 19.7 |

[a]$n_D^{20}$
[b]Metricon 2010 prism coupler reading at 1550 nm for a cured film made using 1% photoinitiator.
[c]Molar concentration of hydrogen atoms in compound (described above)

Example L

A compound having the following structure $$CH=CH_2CO_2CH_2CF_2O-(CF_2CF_2O)_2-CF_2CH_2O_2CCH=CH_2$$

can be used in practicing the invention.

This material was made as follows:

A 250 ml three-neck flask equipped with a mechanical stirrer and a condenser was charged with 30.75 grams of fluorinated tetraethylene glycol (Exfluor), 12.8 ml of acryloyl chloride (Aldrich) and 100 ml of a partially fluorinated solvent called HFE-7200 (3M). While stirring, 22 ml of triethyl amine were added while maintaining the temperature between 50 and 70° C. by cooling with ice water. Once the addition was complete, the sample was allowed to react for 4 hours. The mixture was then washed three times with water. It was then rotovaped to remove both the remaining water and the HFE-7200. Confirmation of the above structure was obtained by IR and NMR measurements.

The properties of this material are shown below:

| Liquid Refractive Index[a] | Cured Refractive Index[b] | Density | # of Hydrogens | Molecular Weight | $C_H$[c] | Liquid Absorbance at 1550[d] |
|---|---|---|---|---|---|---|
| 1.3651 | 1.3742 | 1.517 | 10 | 518 | 29.3 | .075 |

[a]$n_D^{20}$
[b]Metricon 2010 prism coupler reading at 1550 nm for a cured film made using 1% photoinitiator.
[c]Molar concentration of hydrogen atoms in compound as described herein.
[d]Measured in a 1-cm quartz cuvette using a Cary 500 spectrophotometer.

Diffraction gratings, e.g., Bragg diffraction gratings, may be written in partially cured planar waveguide laminates, i.e., one that is not fully cured. Such partially cured waveguide laminates may be fabricated using the photolithographic or reactive-ion etching techniques described in this disclosure, or by any other method that is compatible with the preferred polymerizable compositions disclosed here. The grating is written in at least a partially cured waveguide core, but the grating should extend into the core-adjacent cladding as well.

In general, the partially cured waveguide device in which a grating can be written should be fabricated from materials using methods that produce a low-loss, low-birefringence, high-performance waveguide, such as one made in accordance with the disclosure set forth above. That is, apart from any additional factors discussed below which may be considered in selecting materials especially suitable for making efficient gratings in the waveguide device, the considerations noted above for making low loss waveguides generally should not be disregarded if possible. For example, the preferred polymerizable core and/or cladding compositions are photopolymerizable and contain at least one photoinitiator effective for initiating the photopolymerization of each preferably perfluorinated photopolymerizable compound in the compositions upon exposure to a dosage of actinic radiation effective to partially cure them.

If gratings are to be written in the waveguide, especially preferred materials for use in fabricating at least the core and, preferably, the cladding as well, are partially cured photopolymerizable compositions containing roughly equal weight proportions of at least two photopolymerizable compounds of differing refractive index (when fully cured) and characterized further by one or more of the following properties: Differing functionality, polymerization rates, and molecular diffusion rates within the partially cured polymer matrix. As explained below, these properties are advantageous in writing efficient gratings in partially cured waveguides.

A method of writing diffraction gratings in polymeric waveguides is described in patent application Ser. No. 09/026,764 for "Fabrication of Diffraction Gratings for Optical Signal Devices and Optical Signal Devices Containing the Same," filed on Feb. 20, 1998, the disclosure of which is incorporated herein by reference. In that disclosure, core and cladding waveguide structures are described as being formed in partially cured UV curable materials. The curable compositions include at least two photopolymerizable comonomers. The partially cured waveguide structure is then exposed with additional UV light through a photomask that generates light and dark regions in both the core and cladding. In the light regions, the UV radiation causes additional polymerization of the monomers to occur. Because the monomers are chosen so as to have different polymerization and diffusion rates, the polymer formed in the light areas during the phase mask exposure, or "writing," step has a different composition than the polymer in the dark areas. After exposure through the mask is complete, there remains unreacted monomer.

Without intending to be bound by or limited to any theoretical explanation for the mechanism at work in the invention, it is believed that this unreacted monomer will diffuse to establish a uniform monomer composition throughout the partially cured portions of the device. When the device is subsequently uniformly exposed without a mask, all of the remaining monomer is converted to polymer. This full-cure exposure step locks in the polymeric compositional differences between the light and dark regions and results in a permanent grating. Modulation of the refractive index in the fully cured diffraction grating arises from this difference in composition. As mentioned above, this process works because the polymers resulting from photopolymerizable of the monomers, oligomers, or polymers selected for use in the core composition and, preferably, the cladding composition as well, differ in refractive index and the selected monomers, oligomers, and polymers differ in cure rate and diffusion rate. It is believed that these differences cause the composition at a selected point in the device to vary as a function of exposure time and radiation dosage. If the composition did not vary with exposure, regions that received more exposure through the phase mask would be expected to have the same percentage of each monomer as the dark areas. Consequently, no diffusion would be expected to take place between the light and dark regions. When subsequently uniformly exposed again to achieve full cure, both the light and dark regions would have the same refractive index and no grating would result.

A model for explaining the creation of modulations in the refractive index of a planar waveguide device is shown in FIG. 33A to FIG. 33F. For the purposes of illustration, the simplified case of a binderless two monomer (A* and B*) photopolymerizable system in which the polymerization reaction rate of monomer A* is higher than that of monomer B* is shown. Before exposure to the grating writing radiation, there are both species of unreacted monomer A* and monomer B* in the partially polymerized waveguide, as shown in FIG. 33A. For simplicity, polymer A and polymer B already formed during the waveguide fabrication process are not shown.

Figure 34:
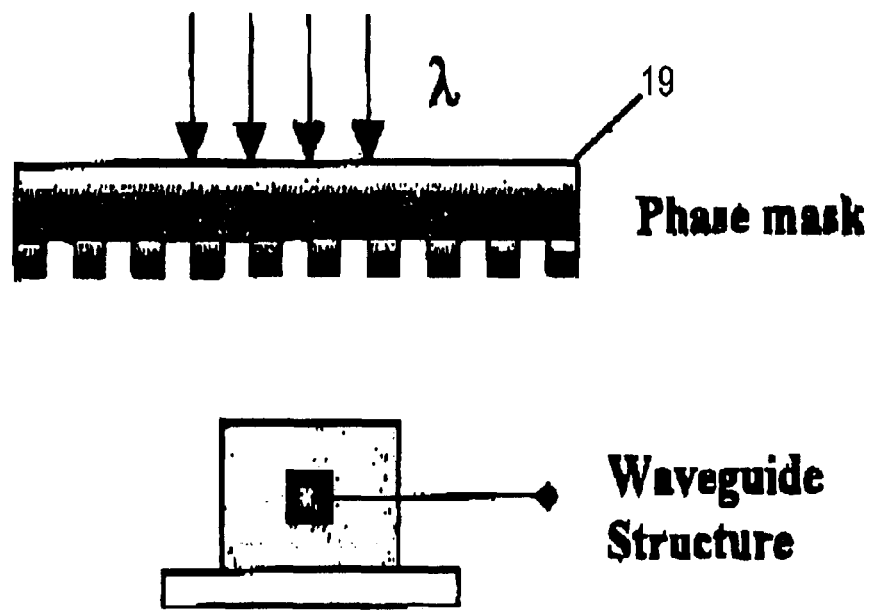
FIG. 34 shows writing of a grating using a phase mask.
Figure 35:
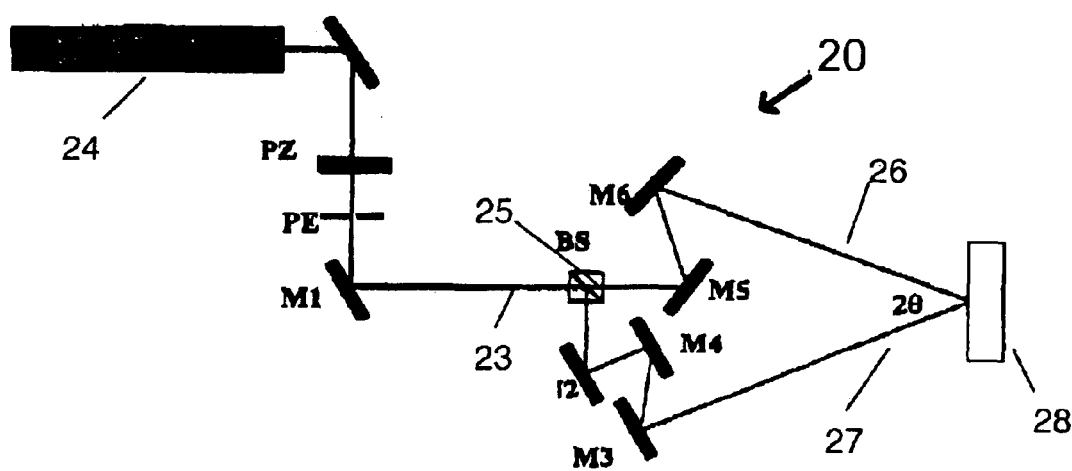
FIG. 35 shows writing of a grating using a two-beam interference set-up.

The sinusoidal pattern 18 of the grating writing radiation intensity, I(x), including intensity maxima and intensity minima, is shown adjacent to the brighter regions and darker regions of the partially polymerized waveguide material in FIG. 33C. The grating writing radiation intensity pattern may be produced using a phase mask 19, as shown in FIG. 34, by a two-beam interference set-up 20, as shown in FIG. 35, or by any other method.

Bearing in mind that the waveguide is already partially polymerized from the waveguide fabrication process, further polymerization of monomer A* is initiated in the brighter regions of the writing pattern. Since the polymerization rate of monomer A* is faster than that of monomer B*, with time, the brighter regions contain primarily polymer A while the darker regions have mainly polymer B even after removal of the interference pattern, as shown in FIG. 33D and FIG. 33E.

The brighter regions 21 are expected to become enriched in the more quickly formed polymer (polymer A) and depleted of the more quickly consumed monomer (monomer A*), as shown in FIG. 33C and FIG. 33D. Due to the resulting concentration gradients of monomer A*, monomer A* is expected to diffuse from the darker region 22 to the brighter region in order to establish a uniform concentration, as shown in FIG. 33D. As in any diffusion process, temperature, concentration difference, and mobility of the monomers will affect the overall diffusion rate.

After some enrichment by diffusion of the faster reacting monomer A* into the light regions and enrichment of the darker regions by the slower reacting monomer B*, the waveguide is flood exposed to react all unreacted monomer to "lock in" the concentration gradients of polymer A and polymer B. The flood exposure taking place in FIG. 33E may be accomplished using any fast-acting radiation source, such as an actinic radiation source suitable for the polymerizable compositions selected, such as a ultraviolet (UV) radiation source (not shown). While heat could be applied to effect the final uniform curing step, actinic radiation is preferred due to its fast cure time in light transmissive systems. Optionally, both a final full actinic radiation cure and a final full heat cure can be carried out. During this step, unreacted monomer B* is polymerized. Assuming that the refractive indices of polymer A and polymer B are different, a steady state or "permanent" modulation of the refractive index, i.e., a grating, is thereby formed in the waveguide. The grating has the same period as the light pattern created by the phase mask, two interfering beams, or other form of writing radiation. The maximum modulation depth is given by the difference of the indices of the individual components, as shown in FIG. 33F.

While differences in refractive index, diffusion, and cure rate can produce gratings, the need for very high grating efficiency is typically not achieved by these differences alone. In order to achieve an even higher compositional change with exposure, it has been discovered that choosing monomers of differing functionality can substantially boost the performance of these gratings. Functionality in this case is defined as the number of actinic radiation curable functional groups per monomer molecule. A wide variety of monomers having actinic radiation curable (ARC) groups could be selected. Preferred ARC groups include epoxies and ethylenically unsaturated groups, such as acrylates, (meth)acrylates, and vinyl ethers, to name just a few. Other suitable reactive groups are described above.

To introduce how the functionality of the monomers can effect composition, several conceptual Examples 1–3 will first be discussed followed by presentation of a preferred comonomeric composition (Example 4). In each of these examples, it is assumed that the relative reaction and diffusion rates of the monomers are the same.

Example 1

A formulation of two monomers with the characteristics shown in Table 1 is provided. As noted above, "functionality" is defined as the number of actinic radiation curable groups per monomer molecule.

TABLE 1

| Monomer | Molecular Wt. | Functionality | Wt. % |
|---|---|---|---|
| A | 100 | 2 | 50 |
| B | 100 | 2 | 50 |

For a 100 g quantity of the above mixture, the values tabulated in Table 2 result.

TABLE 2

| Monomer | Moles | Equivalents | Equivalents % | Initial Relative Weight of Equivalents | Initial Wt. % of Equivalents |
|---|---|---|---|---|---|
| A | 0.5 | 1.0 | 50 | 50 | 50 |
| B | 0.5 | 1.0 | 50 | 50 | 50 |

The values shown for the number of moles and the number of equivalents are the typical values familiar to chemists and physicists. The number of moles is merely the weight of the monomer divided by its molecular weight. The number of equivalents is the number of moles of the monomer multiplied by its functionality. When polymerization occurs, a reactive group from one of the monomers adds to the growing polymer chain. The likelihood that a particular free monomer will react is dependent on the concentration of the reactive groups for the monomers. To determine this concentration at the start of the reaction, the relative amount of equivalents of each monomer was determined as a percentage of the total number of equivalents and reported in the tables as Equivalents %. These values are multiplied by the molecular weight of the respective monomers to arrive at the initial relative weight of equivalents of each of the monomers. The initial wt. % of the equivalents of the monomers is then calculated. As can be seen in Table 2, the initial wt. % of the equivalents of the monomers in this example is the same as the wt. % of the monomers. Because the final wt. % of a monomer in a polymer is equal to the wt. % of the monomers, the fully polymerized polymer will in this case be composed of 50% of monomer A and 50% of monomer B. Based on the initial wt. % of equivalents of the monomers, when the polymer first begins to form, it will also be composed of 50% of monomer A and 50% of monomer B. Since the reaction and diffusion rates are assumed to be the same, this suggests that the concentration of the monomers will not vary as the polymerization proceeds. This means that this idealized material will not likely form a grating by the process previously described. Accordingly, such a component of monomer A and B would not be preferred for use in making photopolymerized diffraction gratings.

Example 2

The properties of interest for two monomers A and B which differ in equivalent, weight are shown in Table 3 below:

TABLE 3

| Monomer | Molecular Wt. | Functionality | Wt. % |
|---|---|---|---|
| A | 100 | 2 | 50 |
| B | 200 | 2 | 50 |

For a 100 g quantity of the above mixture, the values tabulated in Table 4 will result.

TALBE 4

| Monomer | Moles | Equivalents | Equivalents % | Initial Relative Weight of Equivalents | Initial Wt. % of Equivalents |
|---|---|---|---|---|---|
| A | 0.5 | 1.0 | 66.67 | 66.67 | 50 |
| B | 0.25 | 0.5 | 33.33 | 66.67 | 50 |

As can be seen in Table 4, the initial wt. % of equivalents is equal to the wt. % of the monomers. Accordingly, no concentration gradient during cure will be expected and no grating is expected to result.

Example 3

Monomers A and B have the same molecular weights, but they have different functionalities as shown in Table 5:

TABLE 5

| Monomer | Molecular Wt. | Functionality | Wt. % |
|---|---|---|---|
| A | 100 | 2 | 50 |
| B | 100 | 3 | 50 |

For a 100 g quantity of the above mixture, the values shown in Table 6 will result.

TABLE 6

| Monomer | Moles | Equiva-lents | Equivalents % | Initial Relative Weight of Equivalents | Initial Wt. % of Equivalents |
|---|---|---|---|---|---|
| A | 0.5 | 1.0 | 40 | 40 | 40 |
| B | 0.5 | 1.5 | 60 | 60 | 60 |

As shown in Tables 5 and 6, the initial wt. % of equivalents is different than the wt. % of the monomers. This implies that there will be a concentration gradient as polymerization proceeds. Accordingly, such a combination of monomers could be expected to form a grating even if the reaction and diffusion rates of the monomer are the same.

When the reaction first begins, there are equal numbers of molecules of both monomers A and B. Since monomer B has one and one-half as many reactive groups as monomer A, the polymerization will initially use more molecules of B then monomer A. As the reaction proceeds, the concentration of unreacted monomer B molecules will begin to decrease and the likelihood of monomer A molecules polymerizing will increase. Once the polymerization is complete, an equal number of both monomeric molecules will have been consumed by the reaction and the concentration by weight of monomers in the polymer will be equal.

Example 4

Monomer A is octafluorohexanediol diacrylate obtained commercially. Monomer B is the tetra-acrylate of Fluorolink® T brand tetra-functional fluorinated polyether polyol from Ausimont Corporation.

TABLE 7

| Monomer | Molecular Wt. | Functionality | Wt. % |
|---|---|---|---|
| A | 370 | 2 | 50 |
| B | 2416 | 4 | 50 |

For a 100 g quantity of the above mixture of the monomers A and B, the values shown in Table 8 are expected.

TABLE 8

| Monomer | Moles | Equiva-lents | Equivalents % | Initial Relative Weight of Equivalents | Initial Wt. % of Equivalents |
|---|---|---|---|---|---|
| A | 0.135 | 0.2703 | 76.55 | 283.2 | 33.33 |
| B | 0.021 | 0.0828 | 23.45 | 566.5 | 66.67 |

This set of monomers A and B should produce a grating since the values for the weight percent of Table 7 and the initial weight percent of equivalents of Table 8 for each monomer are unequal.

Figure 40:
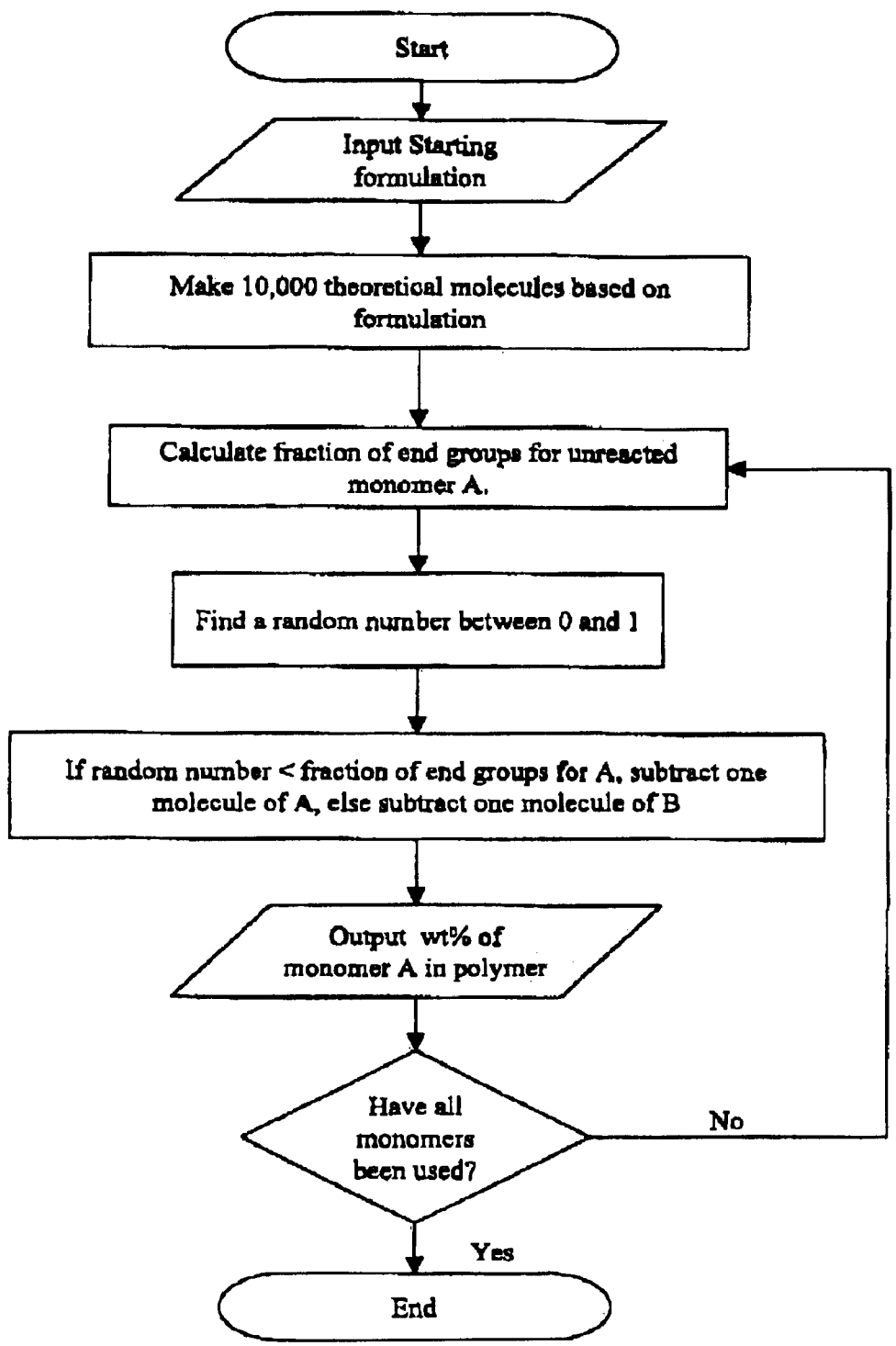
FIG. 40 is the flowsheet for an algorithm useful in screening comonomer system candidates for use as a grating material.

A Monte Carlo calculation was performed for each of the above examples. The calculation was performed using a computer program based on the flow chart shown in FIG. 40. The algorithm can be used to evaluate the potential of a selected pair of monomers characterized in terms of molecular weight, functionality, and initial weight proportions in the composition to form a diffraction grating in waveguides.

The program begins by simulating 10,000 theoretical molecules, e.g., monomers A and B, based on the starting formulation. Since each of the monomers in the above examples is present at the 50 wt. % level, there are 5000 unreacted molecules each monomer at the start of the calculation. The fraction of end groups for the monomer A is calculated. A random number between 0 and 1 is then chosen. If the random number is less than the fraction of end groups for the monomer A, then one molecule of A is considered to have been added to the forming polymer and the number of unreacted molecules of A is decreased by one. If the random number is greater than the fraction of end groups of A, then a molecule of B is considered to have been added to the forming polymer and the number of free molecules of B is decreased by one. The weight % of A in the forming polymer is then calculated and recorded. The fraction of end groups for A in the remaining free monomer is then recalculated. The process is repeated until all of the molecules are converted to polymer.

Figure 41:
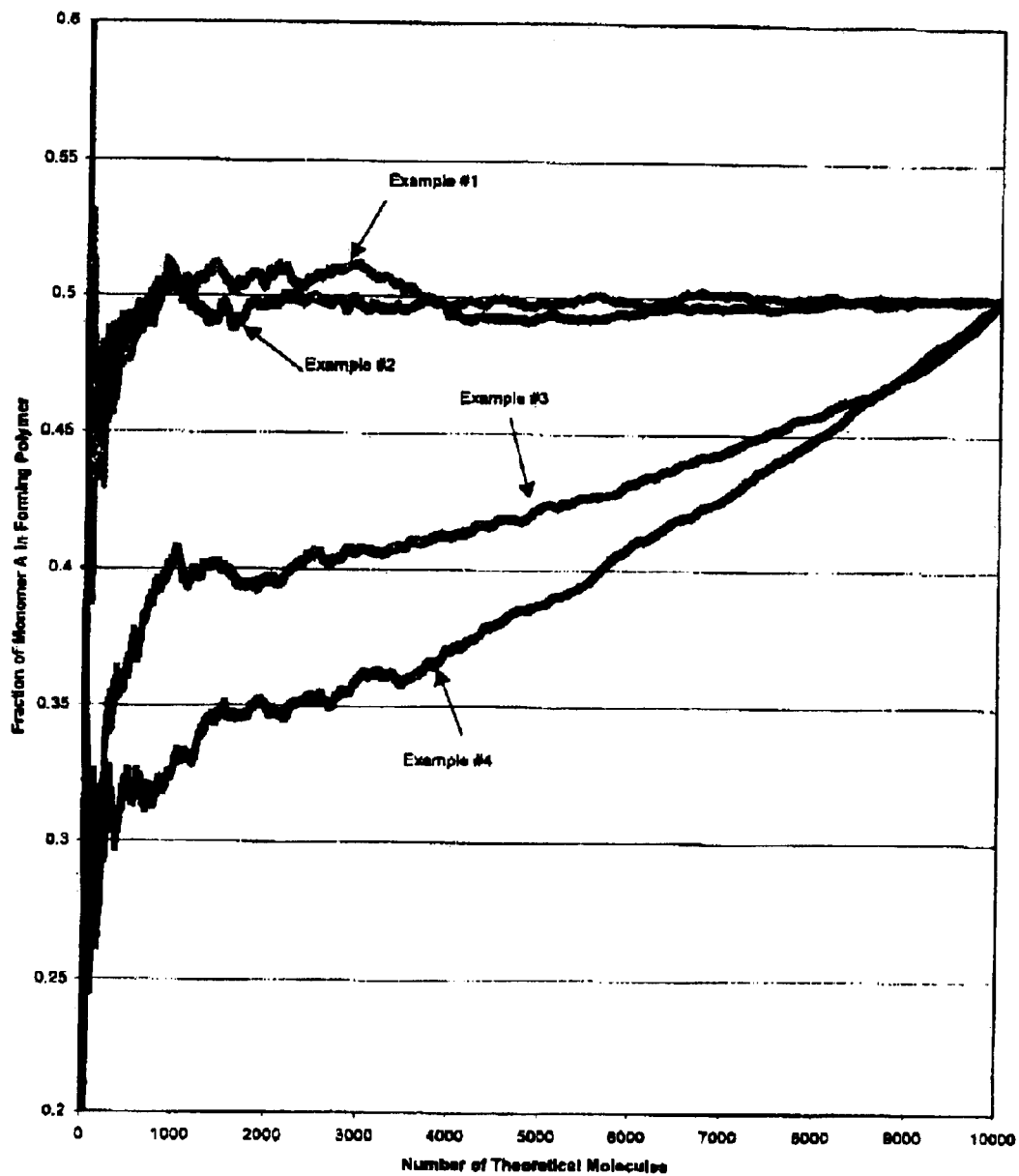
FIG. 41 is a plot generated by a computer program implementing the flowsheet of FIG. 40 which shows the fraction of a monomer formed into a polymer for four comonomer system candidates under evaluation.

FIG. 41 shows the results of these calculations for each of the above examples. Examples 1 and 2 initially show some deviation from the 50% level as a result of the random nature of this process. However, they quickly approach the 50% level after only about a 1000 molecules have been added to the polymer. Since the actual number of molecules used in making a grating is much larger, such random fluctuations would have little impact on making an actual grating. In both Examples 3 and 4, there is some early fluctuation in the values as a result of this random approach, but both curves approach the 0.5 level until virtually all of the molecules are consumed. This calculated result demonstrates the effectiveness of using monomers having different functionalities in producing effective gratings.

Accordingly, a method of making diffraction gratings in a planar polymeric waveguide laminate will now be described. A waveguide is provided which includes a polymeric light guiding core surrounded by a lower refractive index material. As noted above, the lower refractive index material may be a substrate, a buffer layer of a support including a substrate, or a lower cladding layer on a substrate.

The light guiding core in which the grating is to be written should not be fully cured prior to the grating writing step. Preferably, the core and at least that portion of the cladding surrounding the core in which the grating will be written is only partially cured prior to the grating writing step. More preferably, the extent of cure in the waveguide formation step is minimized to allow for a maximum of extent of further polymerization during the grating formation step. Doing so increases the potential difference between the maximum and minimum refractive index in the final grating for a given polymerizable composition.

Especially preferred polymerizable compositions for fabricating the core and, if desired, the cladding layers as well, of waveguide laminates intended for subsequent grating writing are those that include roughly equal weight proportions of two or more multi-functional-photopolymerizable monomers, oligomers, or polymeric compounds ("comonomers") which differ in polymerization reaction rate and functionality. It is preferred that the functionality of the at least two comonomers of the composition differ by at least one, and, preferably, by at least two. The photopolymerizable composition should also include an effective amount of a suitable photoinitiator or mixture of suitable photoinitiators.

Polymerizable compositions having, say, two comonomers of differing functionality should be able to form efficient diffraction gratings even if the polymerization reaction rates of the individual monomers and their respective diffusion rates are the same. The increased performance of the resulting diffraction grating is especially pronounced, however, if a monomer with a higher functionality also polymerizes at a faster rate than a monomer with a lower functionality. If a monomer with a higher functionality polymerizes at a slower rate than a monomer with a lower functionality, then the advantage produced by the higher functionality will be expected to be offset somewhat.

One such suitable core composition includes roughly equal weight proportions of the low-loss low-birefringence perfluorinated photopolymerizable tetra-acrylate compound having structure (VI) (synthesized from Fluorolink® T brand fluorinated polyether polyol from Ausimont USA) and the perfluorinated photopolymerizable di-functional octafluorohexanediol diacrylate compound having structure (VIII). Synthesis of the tetra-acrylate is exemplified by Example A while that of the di-acrylate is exemplified by Example B. A composition of the two compounds together with a photoinitiator is exemplified by Example G.

Figure 36:
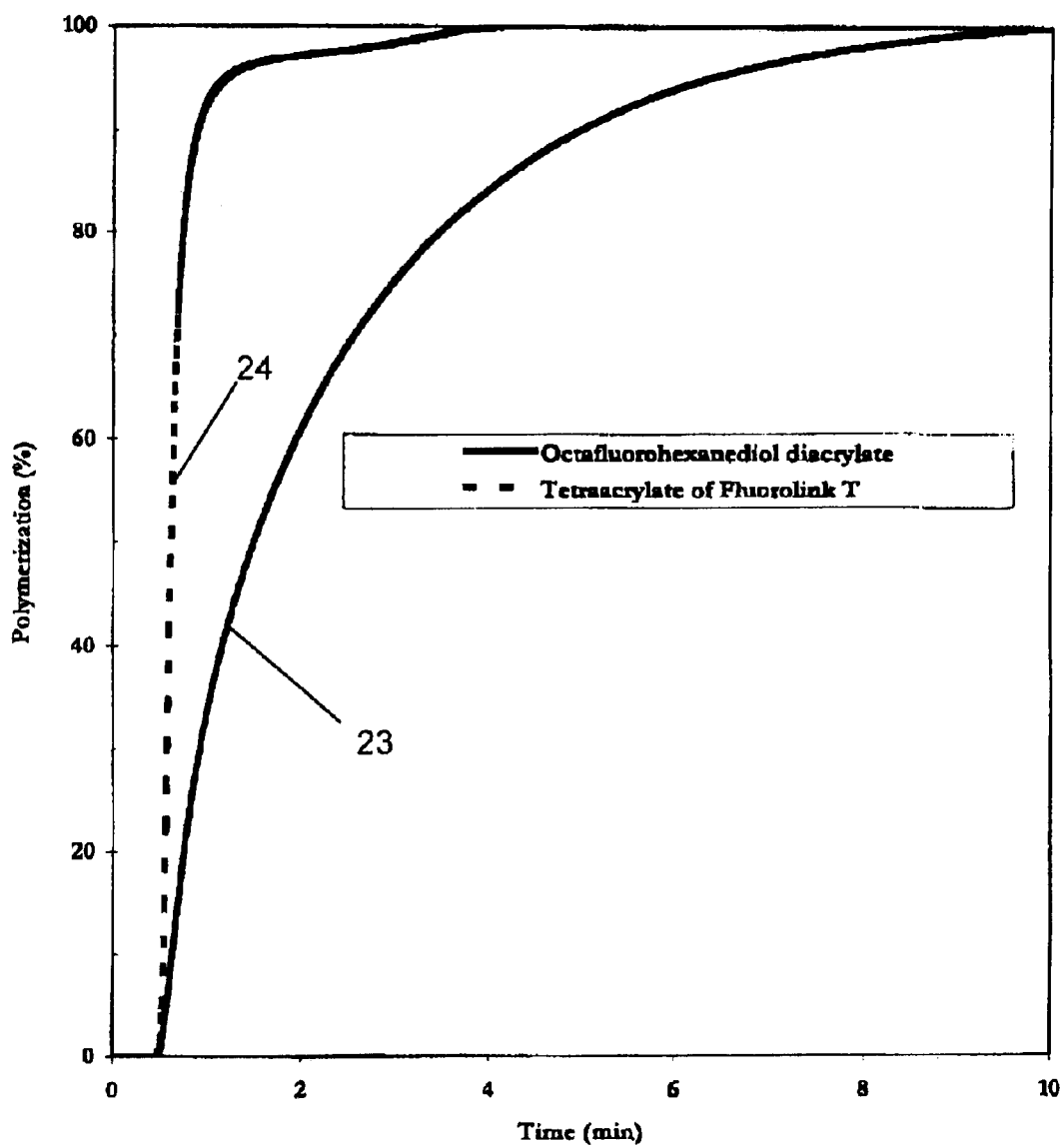
FIG. 36 is a photo-differential scanning calorimetry plot of extent of polymerization versus time for two comonomers that can be used in the invention.

Photo-differential scanning calorimetry studies confirm that the higher functionality comonomer of this system, i.e., the tetra-acrylate of the Fluorolink® T fluorinated polyether polyol (curve 24), reacts at a higher rate than the lower functionality octafluorohexanediol diacrylate (curve 23), as shown at FIG. 36.

Once the partially polymerized waveguide is made, the grating is "written" in the waveguide. This step is accomplished by exposing the inside the partially polymerized waveguide to an interference pattern of sufficient intensity to effect additional polymerization. The interference pattern can be established, for example, using a conventional phase mask 19 designed for writing gratings, such as that shown in FIG. 34, or by using a conventional two-beam interference setup 20, as shown in FIG. 35.

The fabrication of gratings in a planar waveguide using a phase mask is shown schematically in FIG. 34. Light of wavelength $\lambda$ illuminates the phase mask of period $\Lambda$. The writing light is diffracted by the phase mask. The intensity distribution resulting from the interference pattern created by the phase mask at the waveguide initiates further photochemical reaction in the partially cured photopolymerizable composition of the waveguide. The result is the creation of a phase grating written in the waveguide with period $\Lambda_g$. For a phase mask that is designed to diffract in the +1 and −1 orders, the grating period is one-half the phase mask period. Light travelling inside the waveguide grating is reflected when its wavelength is equal to $\lambda_B = 2n_{eff}\Lambda_g$ where $n_{eff}$ is the waveguide's effective refractive index and $\lambda_B$ is the Bragg wavelength.

For the creation of a purely sinusoidal pattern, it is necessary to use a phase mask with a 50% diffraction efficiency in the +1 and −1 diffraction orders and 0% efficiency in the $0^{th}$ and all higher orders. In reality, due to phase mask fabrication errors, there is always some small percentage of light diffracted in unwanted orders. If the phase mask has as little as, say, 5% diffraction efficiency in the $0^{th}$ order, the grating will still have a period of $\Lambda/2$, but the interference maxima are not all at the same intensity level.

A phase mask for writing gratings is itself a grating, typically etched in a silica substrate, with an etching depth such that it diffracts most of the light in the +1 and −1 orders. Beams corresponding to the +1 and −1 diffraction orders are interfered inside the material where they create a sinusoidal interference pattern. This diffraction pattern is very important for the quality of the grating that is formed in the material. Typical measured diffraction efficiencies for commercially available phase masks are $0^{th}$ order ($\eta_0$) 7.7%, $1^{st}$ order ($\eta_1$) 42%, $-1^{st}$ order ($\eta_{-1}$) 39.6%, $2^{nd}$ order ($\eta_2$) 6%, and $-2^{nd}$ order ($\eta_{-2}$) 4%.

Preferably, the waveguide sample is exactly positioned under the phase mask such that the spacing between the phase mask and the waveguide is substantially constant across the waveguide.

Although writing using a phase mask is desirable in a manufacturing setting, as noted above, a two-beam interference set-up can also be used to write the grating in the partially polymerized waveguide. The fabrication of gratings in a planar waveguide using a two-beam interference set-up is shown schematically in FIG. 35. Light beam 23 from light source 24 preferably passes through beam splitter 25 so that two interfering beams 26, 27, separated by angle $2\theta$, interfere at the partially polymerized optical waveguide device 28. Mirrors can be used to position the beams. The light source can be a UV laser or other source of actinic radiation.

One advantage of the two-beam interference approach is that a sinusoidal intensity pattern in the polymerizable material is more likely than in the phase mask approach. Another advantage is that the period of the grating can be changed simply by changing the angle between the interfering beams. Since each phase mask is designed for a specific illuminating wavelength and grating period, a new mask is required every time a change in the grating period is desired.

Gratings have been written in planar waveguiding optical devices according to the invention using both the phase mask and interfering beam approach.

Following the grating writing step, the waveguide with the grating is flood exposed with actinic radiation to fully cure the photopolymerizable layers thereby "locking in" the periodic refractive index variations, and prevent further material diffusion.

Example M

Figure 37:
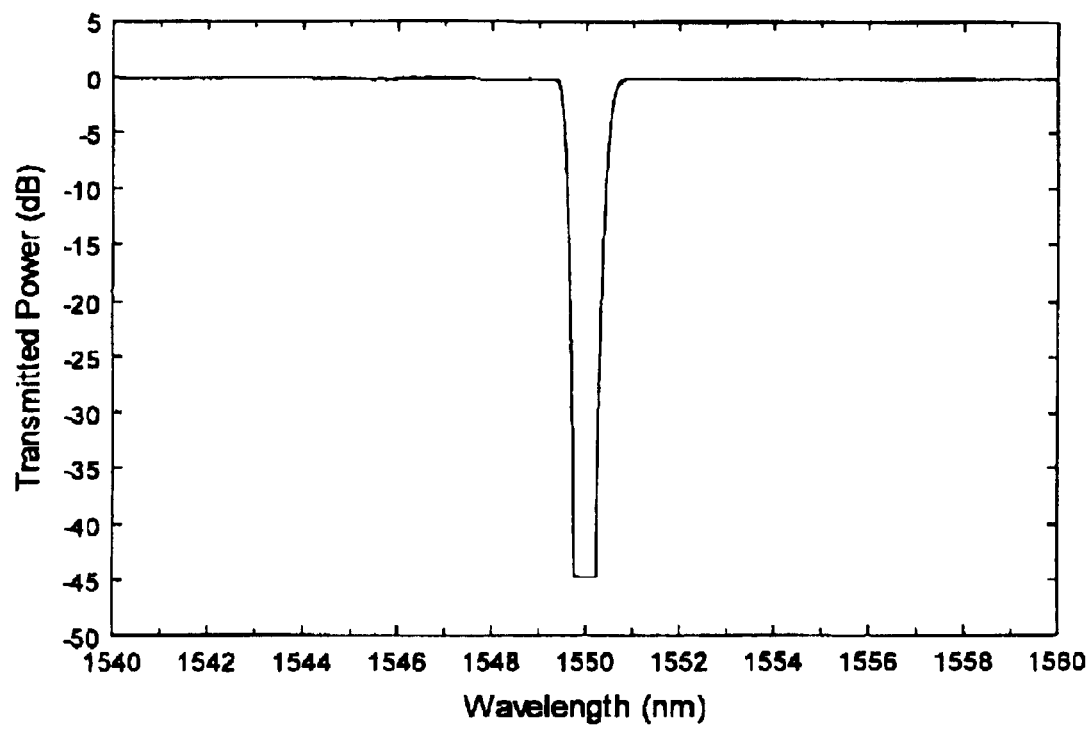
FIG. 37 is a plot of transmitted power versus wavelength near 1550 nm for a reflection waveguide grating made in accordance with the invention.

A grating was written in a single mode straight waveguide according to the procedure described in patent application Ser. No. 09/026,764 referred to above. The waveguide was made using a photopolymerizable composition including about 50 wt. % of the structure (VI) tetra-acrylate obtained from the Fluorolink® T fluorinated polyether polyol material from Ausimont USA and about 50 wt. % of octafluorohexanediol di-acrylate (structure VII) based on the total weight of these two compounds, and including about 1 wt. % photoinitiator. The period of the phase mask was selected to product a reflection at 1550 nm. The transmission spectrum of this grating is shown in FIG. 37. The intensity of the transmitted signal at this wavelength decreased by over 45 dB, the limit of the detection equipment used. As demonstrated by this data, a highly efficient grating was made using. these materials and fabrication methods.

Example N

A clean silicon wafer is used as a substrate. A liquid negative-tone photopolymerizable composition is formulated to include 55.9 wt. % of compound (VI) (the tetraacrylate of the Fluorolink® T brand fluorinated polyether polyol made according to the procedure of Example A), 43.1 wt. % of octafluorohexanediol diacrylate compound (VIII) made according to the procedure of Example B, and 1 wt. % Darocur 1173 photoinitiator to form a cladding polymerizable composition. The cladding composition is spin-coated on the substrate to form a lower cladding coating that is 10 microns thick. The lower cladding coating is then uniformly exposed to ultraviolet light under a mercury lamp (Hg line wavelength=365 nm) to form a solid thin film of refractive index 1.3723 (at 1550 nm when fully cured) as a lower cladding layer. The exposure time is kept short (1 sec.) at this point to obtain a layer that is only partially polymerized.

A liquid negative-tone photopolymerizable composition is formulated to include 49.5 wt. % of compound (VI), 49.5 wt. % of compound (VIII) made according to the procedure of Example B, and 1 wt. % Darocur 1173 photoinitiator to form a core polymerizable composition. The core composition has a refractive index of 1.3786 (at 1550 nm when fully cured). The core composition is spin-coated on the lower cladding layer to form a core coating that is 6 microns thick. The core coating is placed in contact with a photoimaging mask where the waveguiding circuit (a cascaded 4-channel add/drop device where each of the four add/drop elements in the cascade is a Mach-Zehnder interferometer) is clear (the width of the waveguides in the mask is 6 microns). The core coating is selectively UV-cured through the mask under the mercury lamp for a short time of 3 sec. to ensure only partial polymerization. The mask is removed and the unexposed sections are developed away using an appropriate solvent.

Additional cladding composition as listed above is formulated and spin-coated onto the core structure so as to form a conformal layer that is 10 microns thick and that layer is subsequently blanket UV-exposed under the mercury lamp to form a solid conformal film of refractive index 1.3723 (at 1550 nm when fully cured) as an overcladding layer. This layer is also exposed for a short time (1 sec.) to ensure only partial polymerization at this stage. A phase mask with a grating is used to print (using an Argon ion laser operating at 363.8 nm) a grating across the core in each of the four Mach-Zehnder devices. The sample with the planar waveguiding circuit is held parallel to the phase masks at 50 microns from the mask. The laser beam is directed perpendicularly to the mask and the sample. The laser beam diameter is 3 mm (at $1/e^2$ intensity). The laser is scanned 3 mm across the center of the 6-mm-long Mach-Zehnder arms, creating gratings in the three partially cured waveguide layers. The sample is finally subjected to a final UV cure in a nitrogen ambient atmosphere under the mercury lamp (60 sec.) and a final thermal cure (90 deg. C for 1 h) is carried out to effect a full polymerization of all three layers. Testing of the sample reveals that all the gratings are reflecting the desired wavelength channels.

Figure 38:
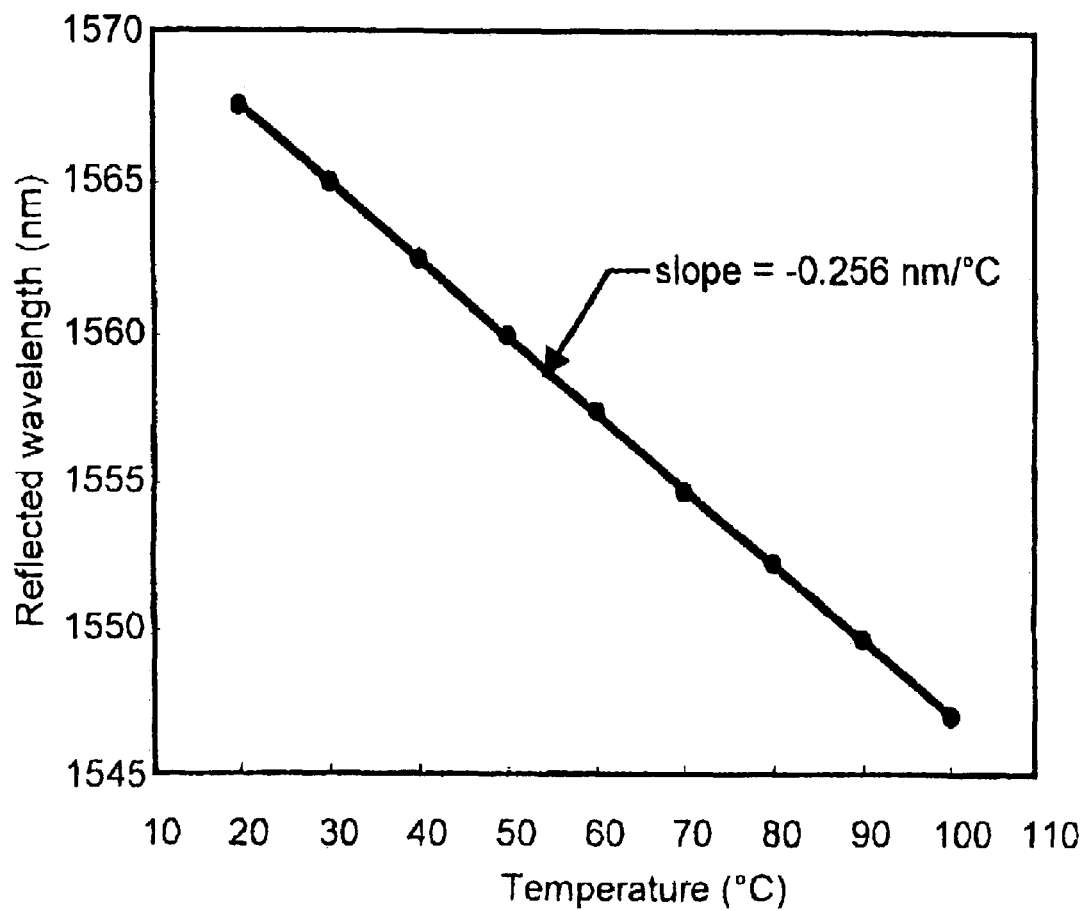
FIG. 38 is a plot demonstrating the strong linear dependence of the reflected wavelength of a grating made in accordance with the invention with temperature.

Compositions made from the same two comonomers in approximately the same proportions as that made in Example G and Example L have very desirable thermo-optic properties after curing. The rate of change in the refractive index of the cured composition with temperature, dn/dt, is approximately $-3 \times 10^{-4}/°$ C. This property results in a tuning rate of about $-0.256$ nm/° C. for gratings made from this material, as shown by the graph appearing in FIG. 38. Importantly, the curve is remarkably linear which permits highly predictable and reproducible tuning of the reflected wavelength.

Figure 39:
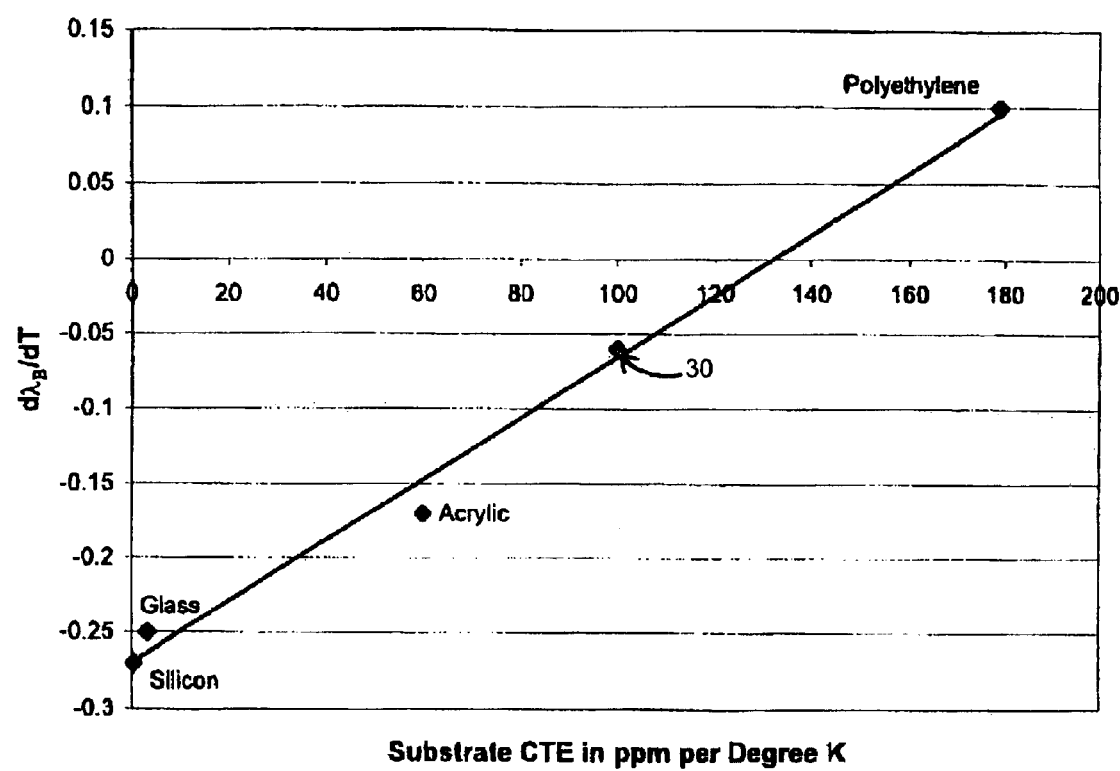
FIG. 39 is a plot of the dependence of the change in the Bragg wavelength of a grating made in accordance with the invention with temperature ($d\lambda_B/dt$) on the coefficient of thermal expansion of the waveguide substrate.

While this property of linear tunability is a highly desired property in making thermo-optic devices, it also useful in making gratings which are stable to temperature changes. This can be accomplished by changing the substrate on which the grating is made. By choosing substrates with different coefficients of thermal expansion (CTE), the expansion rate of the Bragg grating can be altered. The change in the Bragg wavelength of the grating with temperature ($d\lambda_B/dt$), as shown in FIG. 39, can be altered by using substrates with different CTEs. Substrates that produce a value of $d\lambda_B/dt$ as little as $-0.06$ nm/° C. have been developed. Datum 30 refers to the urethane-coated polycarbonate substrate noted above.

Gratings made from the octafluorohexanediol di-acrylate/tetra-acrylate of Fluorolink® T material in accordance with the invention showed a Bragg wavelength shift of just 0.2 nm when the ambient relative humidity was changed by 90% at a constant temperature of 50° C. This result was favorably much smaller than the result obtained using gratings made from other materials where the shift was 3.7 nm. This unexpected benefit may allow optical devices made in accordance with the invention to be packaged without having to be hermetically sealed.

Example O

Photolocking refers to a process wherein a permanent change in refractive index is induced by selective exposure to differing doses of actinic radiation. Several different mechanisms in which a permanent change in refractive index can result when writing a grating are detailed herein. Such mechanisms include different cure rates for monomers with different refractive indexes, and the use of monomers with different functionality. For applications where very strong gratings are needed, the use of materials which are capable of strong photolocking is desirable. As used herein, strong photolocking means the ready tendency to produce a substantially different index of refraction between regions which have been exposed to a higher dose of actinic radiation in relation to those which have received a lesser dose. In other cases where even weak gratings are suitable, the use of materials with weaker photolocking capabilities might be chosen if other benefits are achieved.

One way to measure the photolocking strength of a composition is to look at the ability to make diffusers by for example, the method set forth in U.S. Pat. No. 5,108,857, the disclosure of which is incorporated herein by reference. In this method, a thick slab of UV curable monomer is exposed to highly collimated UV light. Because of the photolocking capability of the monomer, microscopic regions of differing refractive index will form as the material cures. Because of these refractive index differences, light passing through the cured sample will tend to diffuse visible light. The level of diffusion is a measure of the photolocking ability of a monomer mixture, or alternatively stated is a measure of the degree of index modulation (index of refraction difference) between microdomains created by self lensing effects in this example.

To check the photolocking capability of monomer C (product of Example A) and monomer D (product of Example B), a series of diffusers were made with different mixtures of the monomers. The diffusers were made by pouring the monomer inside of a 1-cm thick gasket that was placed on a glass slide. An additional glass slide was then placed on top of the assembly. The assembly was then cured for 300 seconds using an Oriel model 8113 UV curing unit, which has an intensity of 10 mW/cm$^2$ measured at 360 nanometers. The sample was then removed and the glass plates were peeled away. The % transmission of the sample was then measured in the visible light range using a HunterLab spectrophotomer. The results are shown in FIG. 42.

Figure 42:
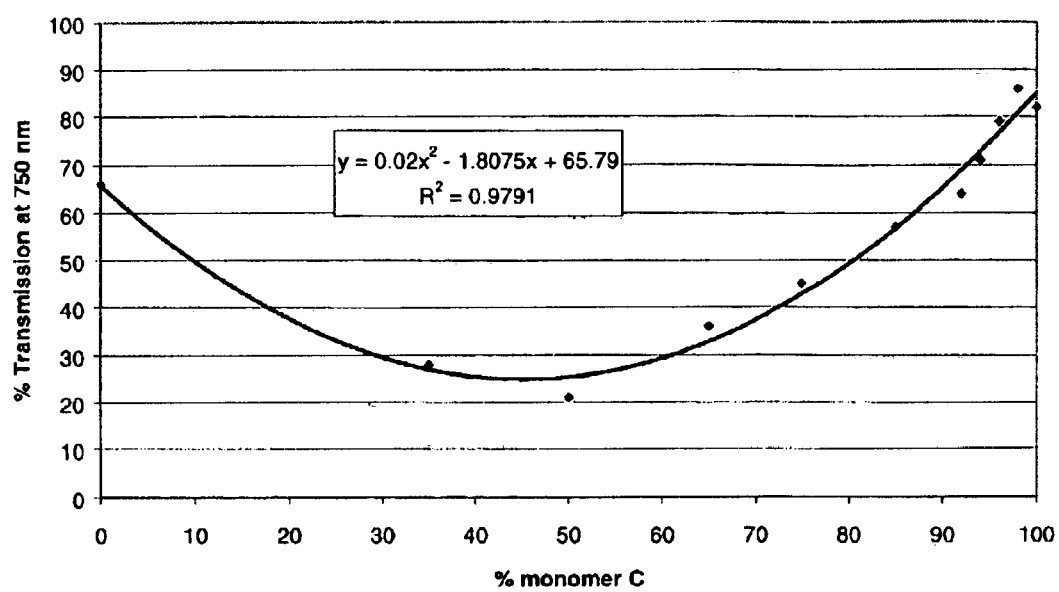
FIG. 42 is a plot of % transmission versus concentration of monomer C in monomer C/monomer D mixture.

As can be seen from FIG. 42, the greatest amount of photolocking occurs at around a 50/50 mixture of the two monomers, where the transmission is at a minimum and the degree of diffusely scattered light is at a maximum. However, significant light diffusion still takes places for the individual monomers in their pure state (100:0 and 0:100). This light scattering could be do to stresses induced in the material during cure or to migration of photoinitiator. In the case of monomer C by itself, part of this diffusion could also result from the fact that the material is typically comprised of monomers with a range of molecular weights. Molecules of this type with different molecular weights will have different levels of fluorination. This results in a range of refractive indexes, which could lead to the light diffusion effect seen.

Figure 43:
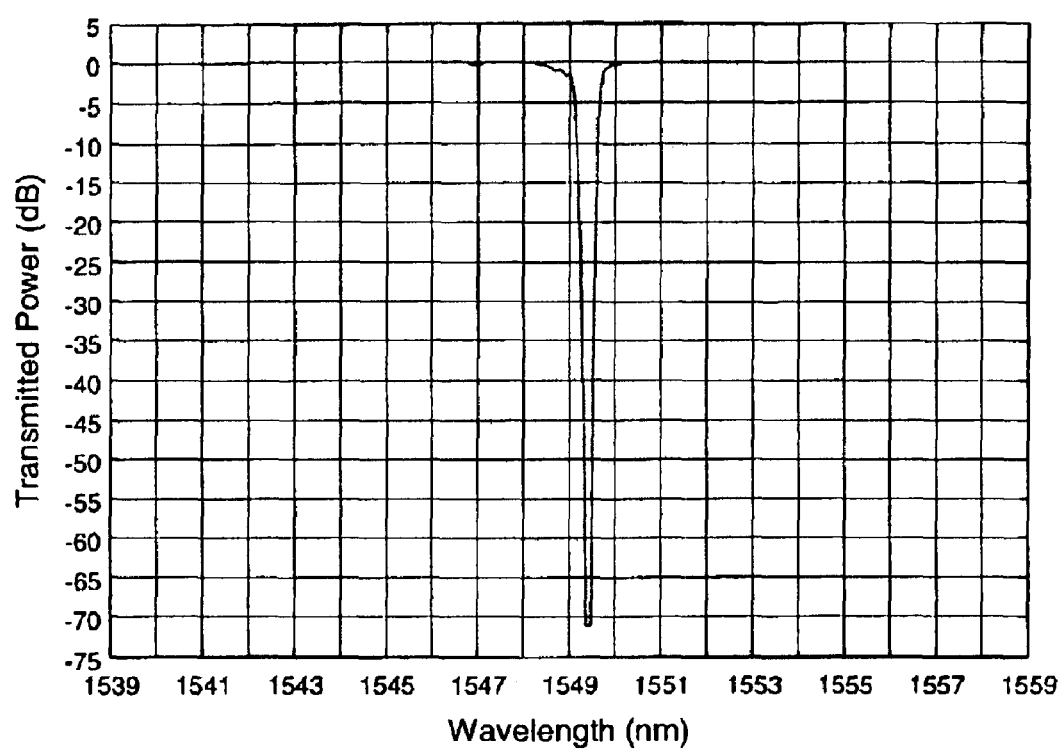
FIG. 43 is a plot of transmitted power versus wavelength (nm) for a waveguide grating made using a 50/50 mixture of monomer C and monomer D.
Figure 44:
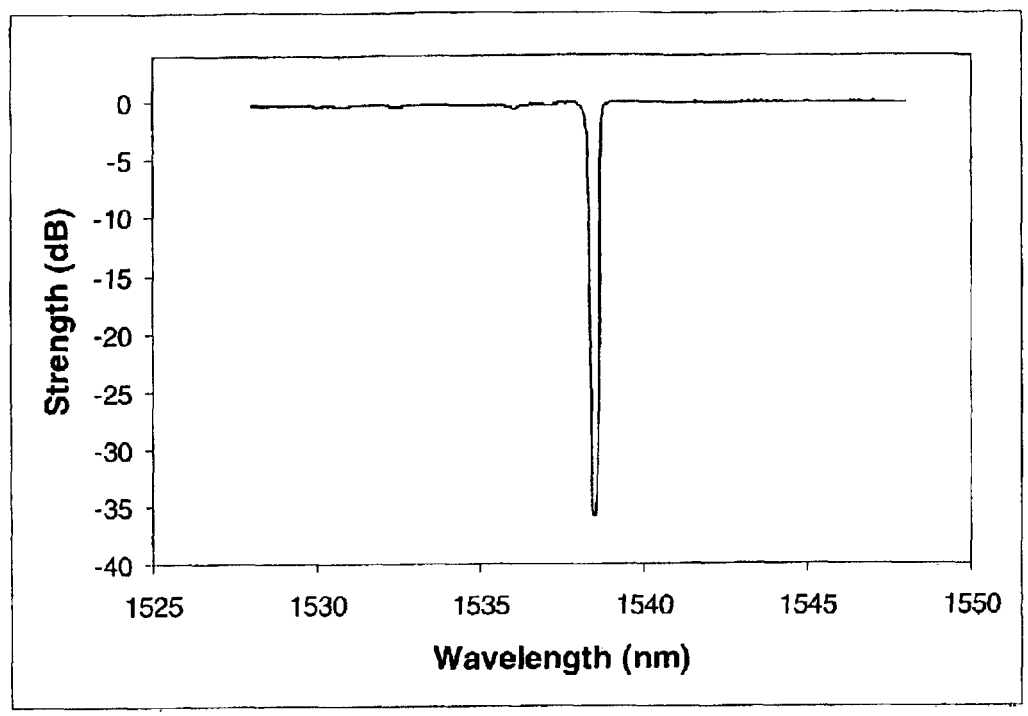
FIG. 44 is a plot of transmitted power versus wavelength (nm) for a waveguide grating made using monomer C.

In gratings made as described above, the depth of the grating for the 50/50 mixture of monomer C and monomer D with 1% Darocure 1173 as a photoinitiator was 72 dB (FIG. 43). The depth for the grating made using just monomer C and 1% Darocure 1173 was 37 dB (FIG. 44).

While the grating written in monomer C was weaker, the optical loss for this material was only 0.2 dB/cm instead of 0.35 for the 50/50 mixture. By choosing monomer systems with various levels of photolocking and other properties such as loss, volatility, spin quality and adhesion, it is possible to tailor the formulation to the specific need of the application.

It will be apparent to one skilled in the art that the manner of making and using the claimed invention has been adequately disclosed in the above-written description of the preferred embodiment(s) taken together with the drawings; and that the above described preferred embodiment(s) of the present invention are susceptible to various modifications, changes, and adaptations, and the same are intended to be comprehended within the meaning and range of equivalents of the appended claims.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

We claim:
1. A light-guiding optical element comprising:
a) an organic upper cladding layer;
b) an organic light transmissive core comprising a fluoropolymer including at least one perfluorinated substituent selected from the group consisting of
—(CF$_2$)$_x$—,
—CF$_2$O—[(CF$_2$CF$_2$O)$_m$(CF$_2$O)$_n$]—CF$_2$—,
—CF(CF$_3$)O(CF$_2$)$_4$O[CF(CF$_3$)CF$_2$O]$_p$CF(CF$_3$)—, and
—CF$_2$O—(CF$_2$CF$_2$O)$_m$—CF$_2$—,
where x is 1–10, m and n designate the number of randomly distributed perfluoroethyleneoxy and perfluoromethyleneoxy backbone repeating subunits, respectively, and p designates the number of —CF(CF$_3$)CF$_2$O— backbone repeating subunits;
c) an organic lower cladding layer; and
d) a substrate.
2. The optical element of claim 1 wherein the fluoropolymer is produced from a core photopolymerizable composition including the compound

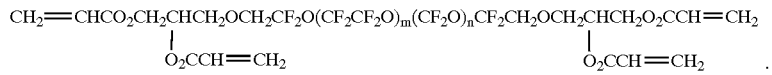

where m and n designate the number of randomly distributed perfluoroethyleneoxy and perfluoromethyleneoxy backbone repeating subunits, respectively, and the ratio m/n falls within the range of about 0.5 to about 1.4.

3. The optical element of claim 2 wherein said core photopolymerizable composition further includes the compound

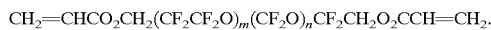

4. The optical element of claim 1 wherein the optical loss of 1550 nm light through said light transmissive core is less than 0.75 dB/cm.

5. The optical element of claim 4 wherein the optical loss of 1550 nm light through said light transmissive core is less than 0.5 dB/cm.

6. The optical element of claim 1 wherein the glass transition point of said upper cladding layer and lower cladding layer is about 40° C. or less and that of the light transmissive core is about 50° C. or less.

7. The optical element of claim 6 wherein the glass transition point of said light transmissive core is less than 0° C.

8. A waveguide grating made from the composition of claim 1.

* * * * *